United States Patent
Kameyama et al.

(10) Patent No.: US 11,592,513 B2
(45) Date of Patent: Feb. 28, 2023

(54) LASER DISTANCE MEASURING APPARATUS

(71) Applicant: Mitsubishi Electric Corporation, Tokyo (JP)

(72) Inventors: Shumpei Kameyama, Tokyo (JP); Takayuki Yanagisawa, Tokyo (JP); Masaharu Imaki, Tokyo (JP); Yusuke Ito, Tokyo (JP); Yosuke Tsuzaki, Tokyo (JP); Masahiro Kawai, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 682 days.

(21) Appl. No.: 16/567,127

(22) Filed: Sep. 11, 2019

(65) Prior Publication Data

US 2020/0132797 A1  Apr. 30, 2020

(30) Foreign Application Priority Data

Oct. 25, 2018 (JP) .............................. JP2018-200495

(51) Int. Cl.
  *G01S 1/30* (2006.01)
  *G01S 17/42* (2006.01)
  *G01S 17/931* (2020.01)

(52) U.S. Cl.
  CPC ................ *G01S 1/30* (2013.01); *G01S 17/42* (2013.01); *G01S 17/931* (2020.01)

(58) Field of Classification Search
  None
  See application file for complete search history.

(56) References Cited

U.S. PATENT DOCUMENTS

| 2015/0153452 | A1 | 6/2015 | Yamamoto et al. |
| 2017/0273161 | A1 | 9/2017 | Nakamura |

(Continued)

FOREIGN PATENT DOCUMENTS

| JP | 5-119152 A | 5/1993 |
| JP | 2006-53076 A | 2/2006 |

(Continued)

OTHER PUBLICATIONS

Communication dated Oct. 1, 2019, from the Japanese Patent Office in counterpart Application No. 2018-200495.

(Continued)

*Primary Examiner* — Christopher G Findley
(74) *Attorney, Agent, or Firm* — Sughrue Mion, PLLC; Richard C. Turner

(57) ABSTRACT

To provide a laser distance measuring apparatus which can increase the measurement frequency per unit time by suppressing the increase in the data amount expressing the measurement time, while ensuring the distance measurement precision and the measurable distance. A laser distance measuring apparatus measures, with a time resolution, a light receiving time which is a time from a time point when the laser beam generating unit emits the laser beam to a time point when the light receiving unit outputs the light receiving signal; calculates an object distance which is a distance to the object, based on the measurement result of the light receiving time by the time measuring device; and changes the time resolution of the time measuring device used for calculation of the object distance, based on detection information.

11 Claims, 16 Drawing Sheets

(56) References Cited

U.S. PATENT DOCUMENTS

2017/0363740 A1    12/2017  Kubota et al.
2018/0128919 A1*  5/2018  Ichikawa .............. G01S 7/4914

FOREIGN PATENT DOCUMENTS

| JP | 2009-257981 A | 11/2009 |
| JP | 2015-105870 A | 6/2015 |
| JP | 2017-173298 A | 9/2017 |

OTHER PUBLICATIONS

Communication dated Dec. 2, 2022 from the German Patent and Trademark Office in Application No. 10 2019 216 084.0.

\* cited by examiner

| | R2<br>0~Tct2m | R1<br>Tct2m~Tct1m |
|---|---|---|
| Δt | Δt2 | Δt1 |

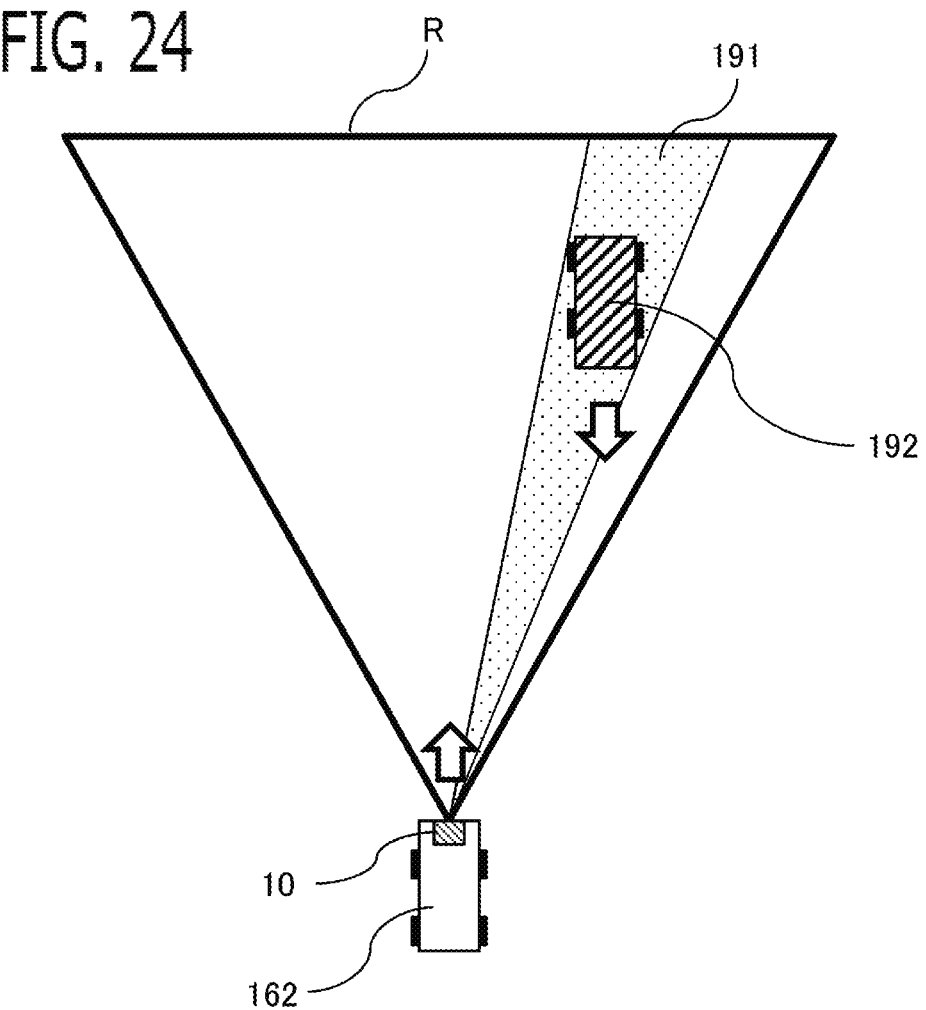

LASER DISTANCE MEASURING APPARATUS

INCORPORATION BY REFERENCE

The disclosure of Japanese Patent Application No. 2018-200495 filed on Oct. 25, 2018 including its specification, claims and drawings, is incorporated herein by reference in its entirety.

BACKGROUND

Present disclosure is related with a laser distance measuring apparatus.

Previously, there has been known the laser distance measuring apparatus which irradiates the light beam, such as a laser beam, to the measuring object, and measures the distance to the object based on the reflected light which is reflected from the object. Such laser distance measuring apparatus is also called LiDAR (Light Detection and Ranging) or a laser radar. By scanning the laser beam of beam source in the specific scan field by the scanning means, the objective distance and the direction are obtained and the three-dimensional distance image is obtained. Since the apparatus mounted on the moving body such as vehicle is used for monitoring person and obstacle surrounding the moving body, it is requested that the measurement field is widen, and by increasing the measurement point number obtained per unit time, person and obstacle are detected in an early stage without overlooking.

For example, in JP 2017-173298 A, the laser distance measuring apparatus mounted on the vehicle is disclosed. In the technology of JP 2017-173298 A, the reflected light of the emitted laser beam from the object is received, and the distance is obtained from its time difference.

SUMMARY

By the way, as characteristics requested for the laser distance measuring apparatus of the moving body, the measurement points which can be measured per unit time are increased as much as possible. This is because in order to detect the obstacle, it is requested that by widening the view field and increasing the emitting frequency of the laser beam per unit time, the spatial resolution of distance measurement is reduced and the update rate of measurement is increased. The frequency of emitting the laser beam per unit time is limited by the time for processing the measured time, in addition to the time until the laser beam reflects the object and returns. Especially about the time for processing, when measuring the long distance object, since time from detecting the reflected light to emitting the next laser beam becomes short, the next distance measurement cannot be performed until the measured time is processed.

The conventional laser distance measuring apparatuses are operating on a fixed apparatus condition. And, when the time information corresponding to distance is processed, the digitized time information data is transferred by a computer with a certain processing capability. Accordingly, since measurable frequency per unit time is limited by the processing capability of the computer and the transfer rate, there is a problem that the resolution of measurement angle drops at scanning, the update rate of one scan, that is, the frame rate, drops, for example. On the other hand, when the time resolution is made coarse in order to reduce the data amount of the measuring time information per one measurement, the accuracy of distance measurement is deteriorated. Accordingly, the light emitting frequency and the distance accuracy are in the trade-off relationship. If the processing capability of the computer and the data transfer is improved in order to relax restrictions, a problem of increase in cost and design difficulty occurs. However, no countermeasures are made against this kind of problem.

In view of the foregoing background, it is desired to provide a laser distance measuring apparatus which can increase the measurement frequency per unit time by suppressing the increase in the data amount expressing the measurement time, while ensuring the distance measurement precision and the measurable distance.

A laser distance measuring apparatus according to the present disclosure, including:

a laser beam generating unit that emits a laser beam;

a light receiving unit that receives a reflected light of the laser beam reflected by an object, and outputs a light receiving signal;

a time measuring device that measures, with a time resolution, a light receiving time which is a time from a time point when the laser beam generating unit emits the laser beam to a time point when the light receiving unit outputs the light receiving signal; and a distance calculation unit that calculates an object distance which is a distance to the object, based on the measurement result of the light receiving time by the time measuring device, wherein the distance calculation unit changes the time resolution of the time measuring device used for calculation of the object distance, based on detection information.

When the time resolution is changed, even if the data amount expressing the light receiving time is the same, the distance measurement precision and the measurable distance varies. According to the laser distance measuring apparatus of the present disclosure, since the time resolution is changed based on the detection information, even if the data amount expressing the light receiving time is not changed, the distance measurement precision and the measurable distance can be adjusted appropriately according to the detection information. Therefore, the increase in the data amount expressing the light receiving time can be suppressed, and the increase in the load given to the processing capability of the computer and the data transfer can be suppressed. Accordingly, the measurement frequency per unit time can be increased, without improving the processing capability of the computer and the data transfer rate. Therefore, the laser distance measuring apparatus with the small angular resolution of the view field and the fast update rate of scan can be realized.

BRIEF DESCRIPTION OF THE DRAWINGS

FIG. 24 is a figure for explaining the relation of the own vehicle and the oncoming vehicle according to Embodiment 10.

DETAILED DESCRIPTION OF THE EMBODIMENTS

1. Embodiment 1

Figure 1:
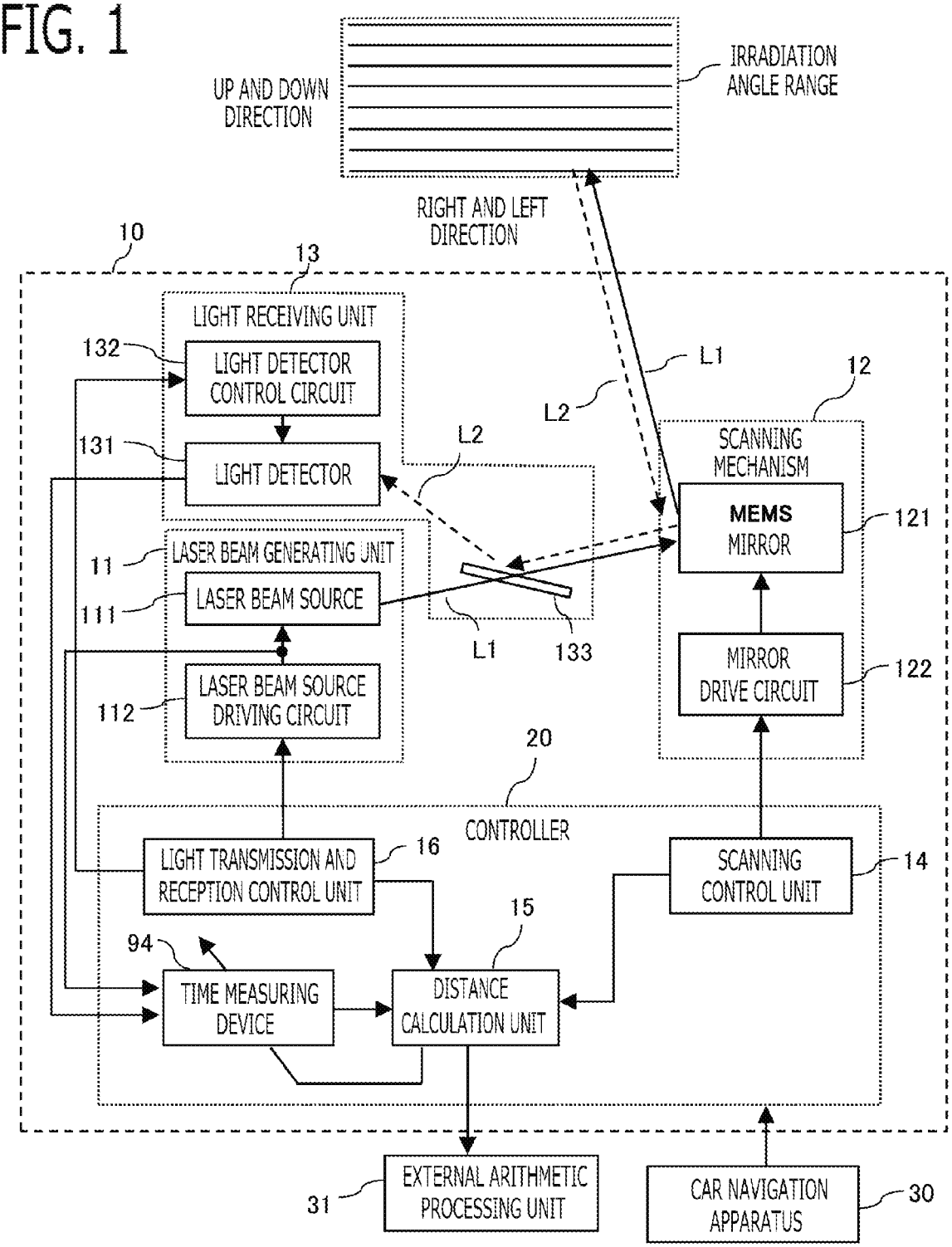
FIG. 1 is a figure showing the schematic configuration of the laser distance measuring apparatus according to Embodiment 1.
Figure 2:
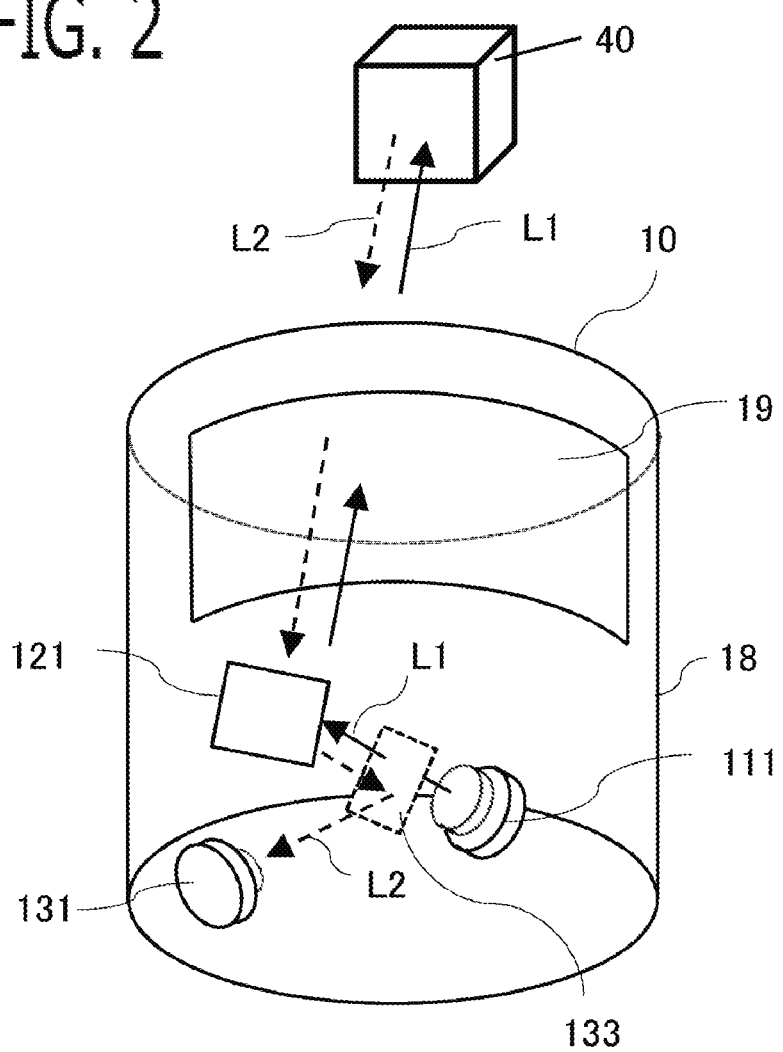
FIG. 2 is a figure showing the schematic diagram of the laser distance measuring apparatus according to Embodiment 1.

A laser distance measuring apparatus 10 according to Embodiment 1 will be explained with reference to drawings. FIG. 1 is a block diagram showing the schematic configuration of the laser distance measuring apparatus 10. FIG. 2 is a schematic diagram showing the schematic arrangement and configuration of the optical system of the laser distance measuring apparatus 10. The laser distance measuring apparatus 10 is also called LiDAR (Light Detection and Ranging) or a laser radar. The laser distance measuring apparatus 10 is mounted on own vehicle, irradiates a laser beam L1 to front of the own vehicle by a two-dimensional scan, and measures a distance to an object, which exists in front of the own vehicle, from the laser distance measuring apparatus 10 (the own vehicle).

The laser distance measuring apparatus 10 is provided with a laser beam generating unit 11, a scanning mechanism 12, a light receiving unit 13, a scanning control unit 14, a distance calculation unit 15, a time measuring device 94, and the like. As described later, the controller 20 is provided with the scanning control unit 14, the distance calculation unit 15, and the time measuring device 94. The laser beam generating unit 11 emits the laser beam L1. The scanning mechanism 12 is a mechanism which changes the irradiation angle of the laser beam L1. The scanning control unit 14 controls the scanning mechanism 12, and scans the irradiation angle of the laser beam periodically. The light receiving unit 13 receives a reflected light L2 of the laser beam reflected by the object, and outputs a light receiving signal. The time measuring device 9 measures, with a time resolution $\Delta t$, a light receiving time Tct which is a time from a time point when the laser beam generating unit 11 emits the laser beam L1 to a time point when the light receiving unit 13 outputs the light receiving signal. The distance calculation unit 15 calculates an object distance which is a distance to the object, based on the light receiving signal. The distance calculation unit 15 changes the time resolution $\Delta t$ of the time measuring device 94 used for calculation of the object distance, based on detection information.

1-1. Laser Beam Generating Unit 11

Figure 8:
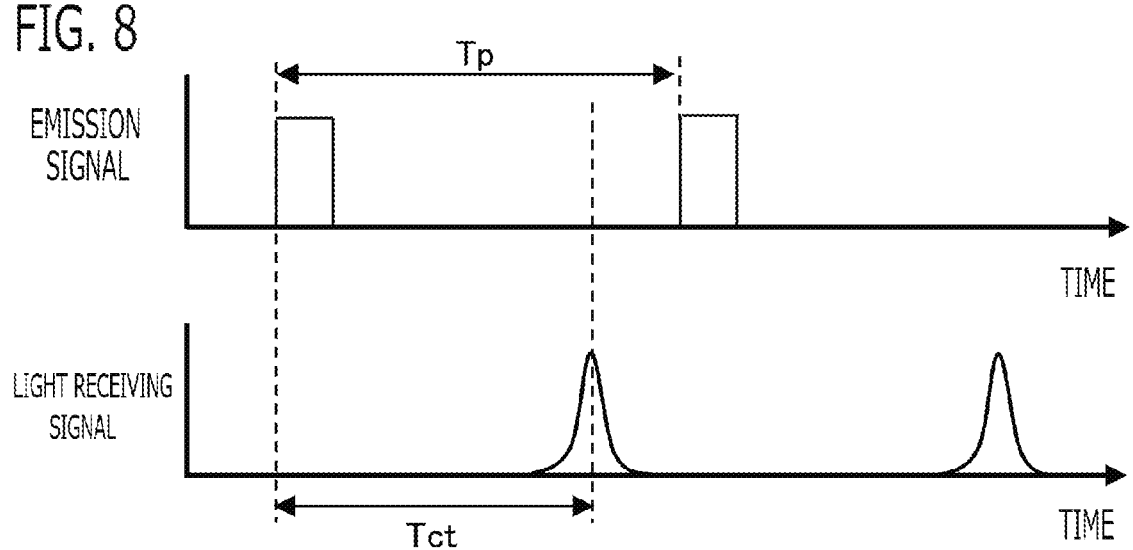
FIG. 8 is a time chart explaining the emission signal and the light receiving signal according to Embodiment 1.

The laser beam generating unit 11 emits the laser beam L1. The laser beam generating unit 11 is provided with a laser beam source 111 and a laser beam source driving circuit 112. The laser beam source driving circuit 112 generates a pulse form output signal (emission signal) which is turned ON at a pulse cycle Tp, as shown in FIG. 8. The laser beam source driving circuit 112 generates the pulse form output signal, based on a command signal from a light transmission and reception control unit 16 described below. When the output signal transmitted from the laser beam source driving circuit 112 is turned ON, the laser beam source 111 generates the laser beam L1 of near infrared wavelength, and emits it toward the scanning mechanism 12. The laser beam L1 emitted from the laser beam source 111 transmits a collection mirror 133 disposed between the laser beam source 111 and the scanning mechanism 12.

1-2. Scanning Mechanism 12

The scanning mechanism 12 changes the irradiation angle of the laser beam L1. In the present embodiment, the scanning mechanism 12 changes an irradiation angle of the laser beam L1, which is irradiated to front of the own vehicle, to a right and left direction and an up and down direction with respect to a traveling direction (an irradiation center line) of the own vehicle. The scanning mechanism 12 is provided with a movable mirror 121 and a mirror drive circuit 122. As shown in FIG. 2, the laser beam L1 emitted from the laser beam source 111 transmits the collection mirror 133 and is reflected by the movable mirror 121, and then it transmits the transmission window 19 provided in the housing 9 and is irradiated to front of the own vehicle at an irradiation angle according to angle of the movable mirror 121.

Figure 3:
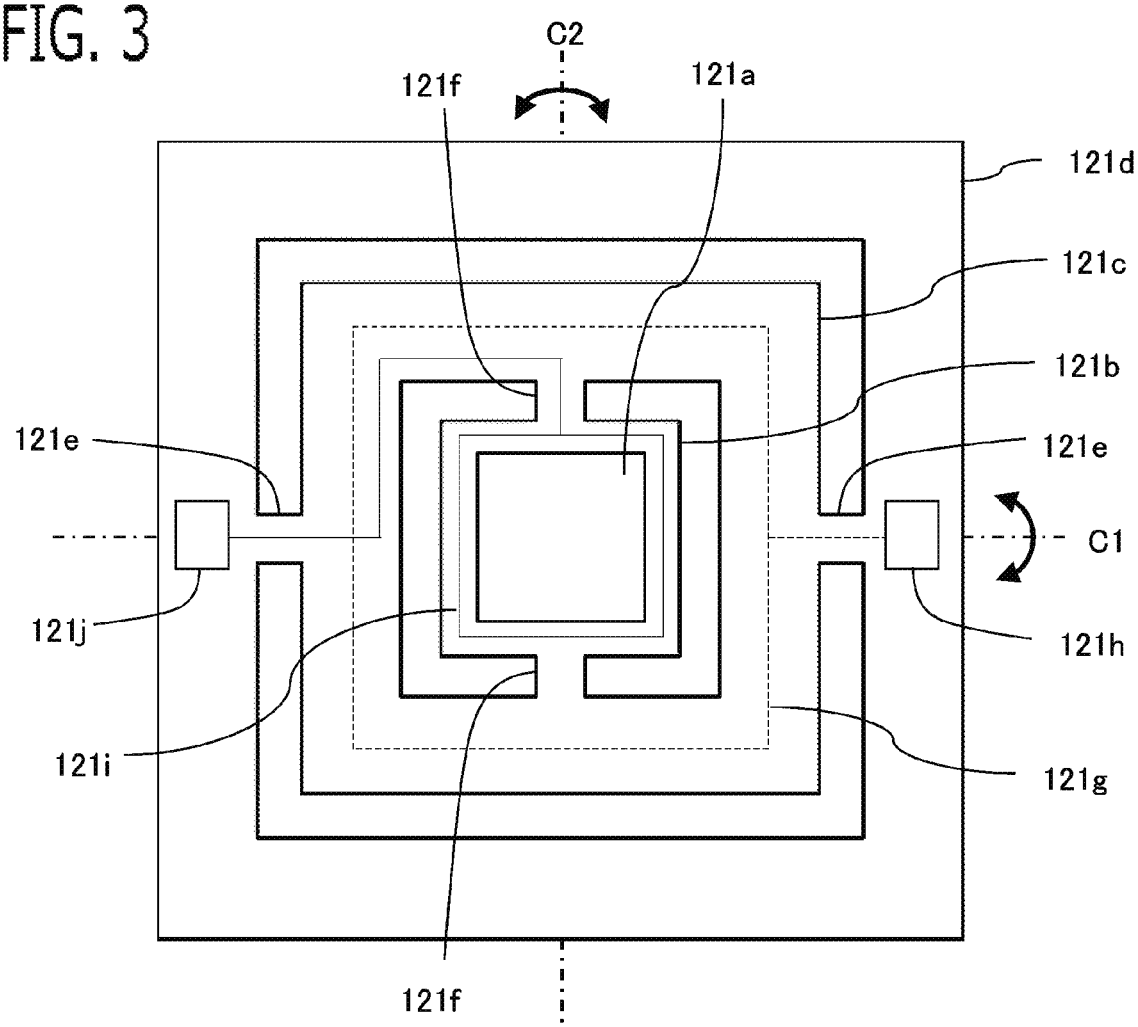
FIG. 3 is a figure for explaining the MEMS mirror according to Embodiment 1.

In the present embodiment, the movable mirror 121 is a MEMS mirror 121 (Micro Electro Mechanical Systems). As shown in FIG. 3, the MEMS mirror 121 is provided with a rolling mechanism which rotates a mirror 121a around a first axis C1 and a second axis C2 which are orthogonal to each other. The MEMS mirror 121 is provided with an inner frame 121b of a rectangular plate shape which is provided with the mirror 121a, an intermediate frame 121c of a rectangular ring plate shape disposed outside the inner frame 121b, and an outer frame 121d of a rectangular plate shape disposed outside the intermediate frame 121c. The outer frame 121d is fixed to a body of the MEMS mirror 121.

The outer frame 121d and the intermediate frame 121c are connected by right and left two first torsion bars 121e which have torsional elasticity. The intermediate frame 121c is twisted around a first axis C1 which connects the two first torsion bars 121e, with respect to the outer frame 121d. When twisted around the first axis C1 to one side or the other side, the irradiation angle of the laser beam L1 changes to the up side or the down side. The intermediate frame 121c and the inner frame 121b are connected by up and down two second torsion bars 121f which have elasticity. The inner frame 121b is twisted around a second axis C2 which connects the two second torsion bars 121f, with respect to the intermediate frame 121c. When twisted around the second axis C2 to one side or the other side, the irradiation angle of the laser beam L1 changes to left side or right side.

An annular first coil 121g along the frame is provided in the intermediate frame 121c. A first electrode pad 121h connected to the first coil 121g is provided in the outer frame 121d. An annular second coil 121i along the frame is provided in the inner frame 121b. A second electrode pad 121j connected to the second coil 121i is provided in the outer frame 121d. A permanent magnet (not shown) is provided in the MEMS mirror 121. When a positive or negative current flows into the first coil 121g, the Lorentz force which twists the intermediate frame 121c around the first axis C1 to one side or the other side occurs. And, the torsional angle is proportional to the magnitude of current. When a positive or negative current flows into the second coil 121i, the Lorentz force which twists the inner frame 121b around the second axis C2 to one side or the other side occurs. And, the torsional angle is proportional to the magnitude of current.

Figure 4:
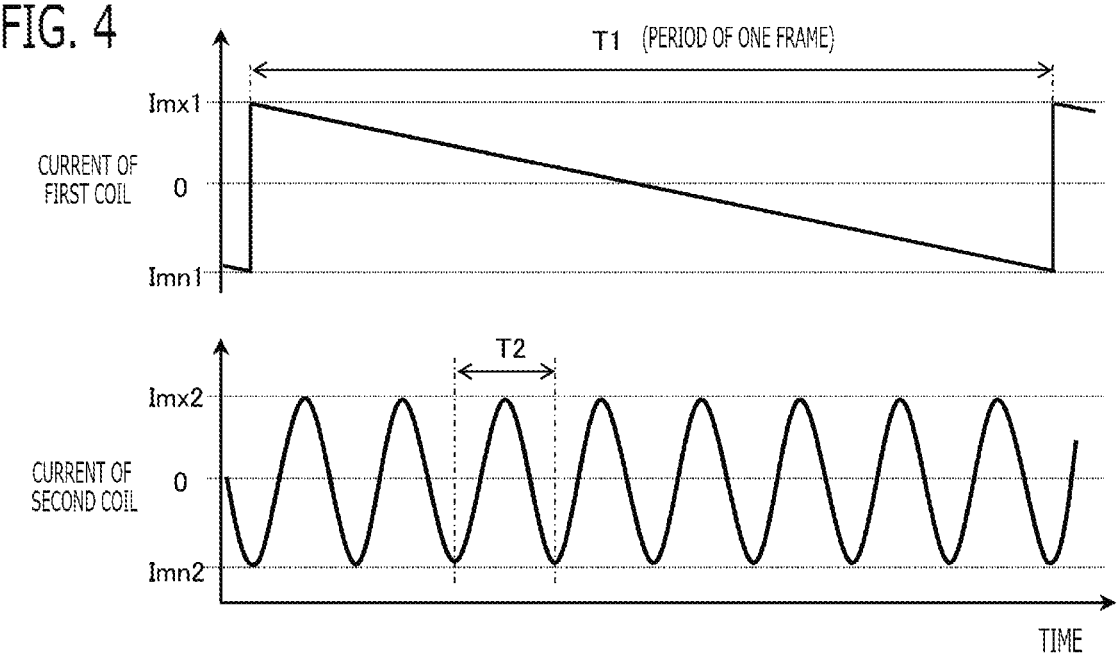
FIG. 4 is a time chart for explaining the driving current of the MEMS mirror according to Embodiment 1.
Figure 5:
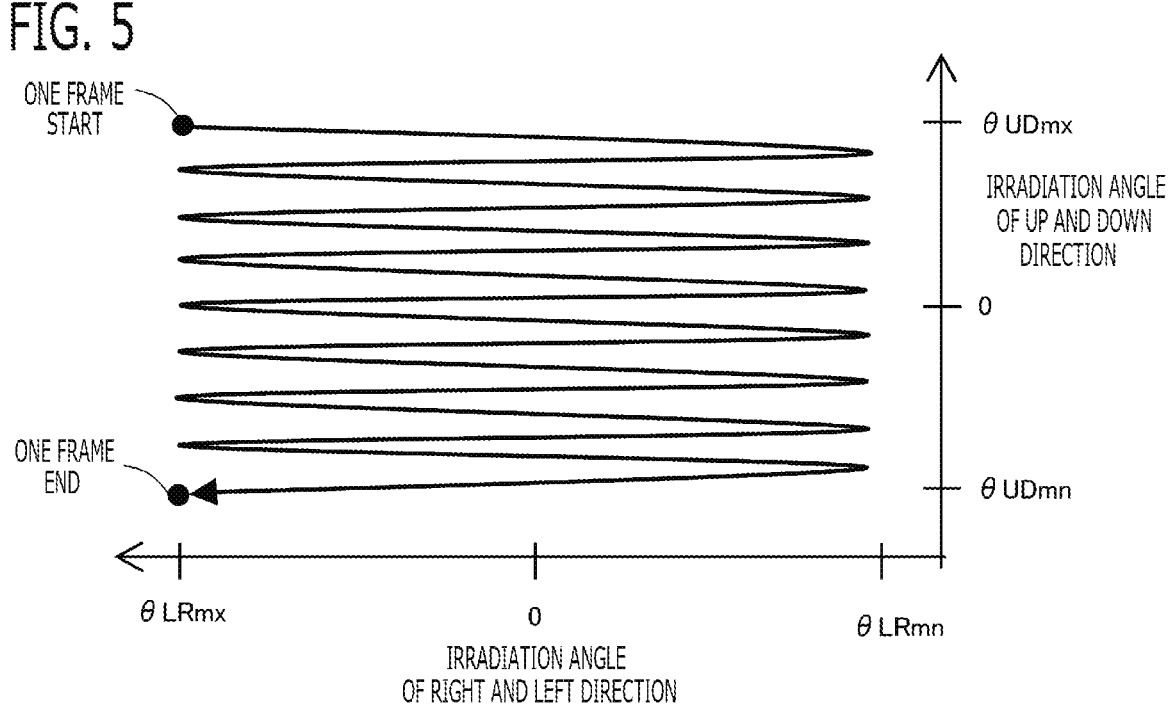
FIG. 5 is a figure for explaining the irradiation angle range of the up and down direction and the right and left direction according to Embodiment 1.

As shown in the upper stage time chart of FIG. 4, the mirror drive circuit 122 supplies a current, which oscillates between a positive first maximum current value Imx1 and a negative first minimum current value Imn1 at a first period T1, to the first coil 121g via the first electrode pad 121h, according to the command signal of the scanning control unit 14. The first period T1 is a period for one frame of the two-dimensional scan. The vibration waveform of current is a saw tooth wave, a triangular wave, or the like. As shown in FIG. 5, the laser beam oscillates between a maximum irradiation angle θUDmx of the up and down direction corresponding to the positive first maximum current value Imx1, and a minimum irradiation angle θUDmn of the up and down direction corresponding to the negative first minimum current value Imn1 at the first period T1. The first maximum current value Imx1 and the first minimum current value Imn1 may be changed according to the operating condition.

As shown in the lower stage graph of FIG. 4, the mirror drive circuit 122 supplies a current, which oscillates between a positive second maximum current value Imx2 and a negative second minimum current value Imn2 at a second period T2, to the second coil 121i via the second electrode pad 121j, according to the command signal of the scanning control unit 14. The second period T2 is set to a value shorter than the first period T1, and is set to a value obtained by dividing the first period T1 by a reciprocation scanning frequency of the right and left direction in one frame. The vibration waveform of current is a sine wave, a rectangular wave, or the like. As shown in FIG. 5, the laser beam oscillates between a maximum irradiation angle θLRmx of the right and left direction corresponding to the positive second maximum current value Imx2, and a minimum irradiation angle θLRmn of the right and left direction corresponding to the negative second minimum current value Imn2 at the second period T2. The second maximum current value Imx2 and the second minimum current value Imn2 may be changed according to the operating condition.

1-3. Light Receiving Unit 13

The light receiving unit 13 receives a reflected light L2 of the laser beam reflected by an object in front of the own vehicle, and outputs a light receiving signal. The light receiving unit 13 is provided with a light detector 131, a light detector control circuit 132, and a collection mirror 133. As shown in FIG. 2, the reflected light L2 reflected by the object 40 in front of the own vehicle transmits the transmission window 19 and is reflected by the movable mirror 121, and then it is reflected by the collection mirror 133 and enters the light detector 131.

The light detector 131 is provided with APD (Avalanche Photo Diode) and the like as a photo detector, and outputs the light receiving signal according to the received reflected light L2. The light detector control circuit 132 controls operation of the light detector 131 based on the command signal from the light transmission and reception control unit 16. The light receiving signal outputted from the light detector 131 is inputted into the time measuring device 94.

1-4. Controller 20

Figure 6:
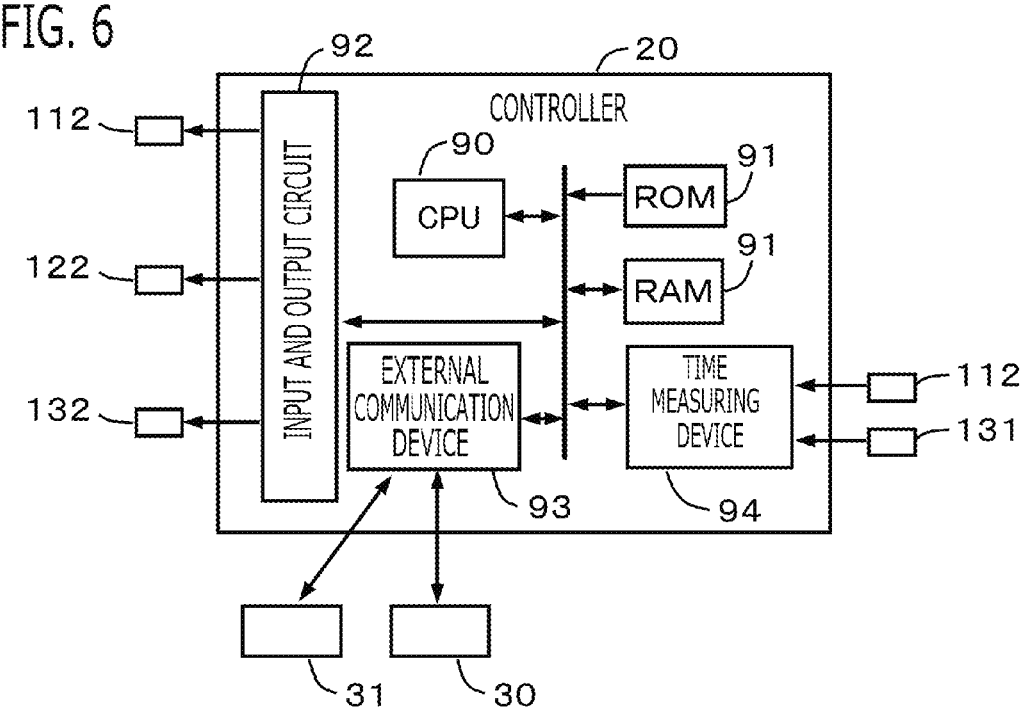
FIG. 6 is a hardware configuration diagram of the controller according to Embodiment 1.

The laser distance measuring apparatus 10 is provided with a controller 20. The controller 20 is provided with functional parts such as the scanning control unit 14, the distance calculation unit 15, the light transmission and reception control unit 16, and the like. Each function of the controller 20 is realized by processing circuits provided in the controller 20. Specifically, as shown in FIG. 6, the controller 20 is provided, as processing circuits, with an arithmetic processor (computer) 90 such as a CPU (Central Processing Unit), storage apparatuses 91 which exchange data with the arithmetic processor 90, an input and output circuit 92 which inputs and outputs external signals to the arithmetic processor 90, an external communication device 93 which performs data communication with external apparatus of the laser distance measuring apparatus 10, the time measuring device 94 and the like.

As the arithmetic processor 90, ASIC (Application Specific Integrated Circuit), IC (Integrated Circuit), DSP (Digital Signal Processor), FPGA (Field Programmable Gate Array), various kinds of logical circuits, various kinds of signal processing circuits, and the like may be provided. As the arithmetic processor 90, a plurality of the same type ones or the different type ones may be provided, and each processing may be shared and executed. As the storage apparatuses 91, there are provided a RAM (Random Access Memory) which can read data and write data from the arithmetic processor 90, a ROM (Read Only Memory) which can read data from the arithmetic processor 90, and the like. As the storage apparatuses 91, various kinds of storage apparatus, such as a flash memory and EEPROM (Electrically Erasable Programmable Read Only Memory) may be used.

The input and output circuit 92 is connected to the laser beam source driving circuit 112, the mirror drive circuit 122, the light detector 131, the light detector control circuit 132, and the like; and is provided with a communication circuit which performs transmission and reception of data and a control command between these and the arithmetic processor 90, an A/D converter, a D/A converter, an output ports, and the like. The input and output circuit 92 is provided with an arithmetic processor which controls each circuit. The external communication device 93 communicates with external apparatuses such as a car navigation apparatus 30 and an external arithmetic processing unit 31.

Then, the arithmetic processor 90 runs software items (programs) stored in the storage apparatus 91 such as a ROM and collaborates with other hardware devices in the controller 20, such as the storage apparatus 91, the input and output circuit 92, and the external communication device 93, so that the respective functions of the functional parts 14 to 16 included in the controller 20 are realized. Setting data items such as a resolution setting data to be utilized in the functional parts 14 to 16 are stored, as part of software items (programs), in the storage apparatus 91 such as a ROM. Each function of the controller 20 will be described in detail below.

<Light Transmission and Reception Control Unit 16>

The light transmission and reception control unit 16 transmits a command signal to the laser beam source driving circuit 112 to output a pulse form laser beam which has a pulse width at the pulse cycle Tp. The light transmission and reception control unit 16 transmits a command signal to the light detector control circuit 132 to output a light receiving signal from the light detector 131.

<Scanning Control Unit 14>

The scanning control unit 14 controls the scanning mechanism 12 to scan the irradiation angle of the laser beam. In the present embodiment, the scanning control unit 14 controls the scanning mechanism 12 to performs a two-dimensional scan which scan the laser beam L1 in an irradiation angle range of the right and left direction with respect to the traveling direction of the own vehicle, and scans the laser beam L1 in an irradiation angle range of the up and down direction with respect to the traveling direction of the own vehicle.

The scanning control unit 14 transmits the command signal to scan the irradiation angle of the laser beam in the irradiation angle range of the up and down direction at the first period T1, to the mirror drive circuit 122. Specifically, the scanning control unit 14 transmits the command signal of the positive first maximum current value Imx1 and the negative first minimum current value Imn1 of the current supplied to the first coil 121g, and the first period T1, to the mirror drive circuit 122.

And, the scanning control unit 14 transmits the command signal to scan the irradiation angle of the laser beam in the irradiation angle range of the right and left direction at the second period T2, to the mirror drive circuit 122. Specifically, the scanning control unit 14 transmits the command signal of the positive second maximum current value Imx2 and the negative second minimum current value Imn2 of the current supplied to the second coil 121i, and the second period T2, to the mirror drive circuit 122. The scanning control unit 14 sets a value obtained by dividing the first period T1 by the reciprocation scanning frequency of the right and left direction in one frame, to the second period T2.

As shown in FIG. 5, the irradiation angle of the laser beam L1 is scanned once in the two-dimensional scan field of rectangular shape at the first period T1. This one scan of the two-dimensional scan field is called as one frame.

<Time Measuring Device 94>

The time measuring device 9 measures, with a time resolution $\Delta t$, a light receiving time Tct which is a time from a time point when the laser beam generating unit 11 emits the laser beam L1 to a time point when the light receiving unit 13 outputs the light receiving signal. The emission signal of the laser beam and the light receiving signal are inputted into the time measuring device 94. The time measuring device 94 measures a time Tct (the light receiving time Tct) from a time point when the emission signal of the laser beam is inputted to a time point when the light receiving signal is inputted; and outputs the signal representing the measurement result of the light receiving time Tct. The output signal is inputted into the arithmetic processor 90. In the present embodiment, the time measuring device 94 measures the light receiving time Tct with the time resolution $\Delta t$ transmitted from the distance calculation unit 15 (the arithmetic processor 90) described below.

In the present embodiment, the time measuring device 94 is a counter type. The time measuring device 94 is a so-called time digital converter (TDC: Time to Digital Converter) which converts signal in time domain into a digital value.

An output signal (light emission signal) from the laser beam source driving circuit 112 to the laser beam source 111, an output signal (light receiving signal) of the light detector 131, and a command signal of the time resolution $\Delta t$ from the distance calculation unit 15 (arithmetic processor 90) are inputted into the time measuring device 94. When the output signal (light emission signal) of the laser beam source driving circuit 112 as a start signal exceeds a threshold value, the time measuring device 94 increases a counter value one by one from 0, whenever time of the time resolution $\Delta t$ commanded from the arithmetic processor 90 elapses. Then, the time measuring device 94 outputs the counter value when the output signal (light receiving signal) of the light detector 131 as a stop signal exceeds the threshold value, as the light receiving time Tct. The time measuring device 94 transmits the counter value as the light receiving time Tct to the arithmetic processor 90 by binary digital data. At this time, the time measuring device 94 transmits the counter value by 1 bit or plural bits to the arithmetic processor 90 by serial communication or parallel communication. Alternatively, the time measuring device 94 may output the counter value to the A/D converter of the input and output circuit 92 by analog data (voltage value), and the A/D converter may transmit A/D-converted digital data of predetermined number of bits, to the arithmetic processor 90 by serial communication or parallel communication.

Figure 9:
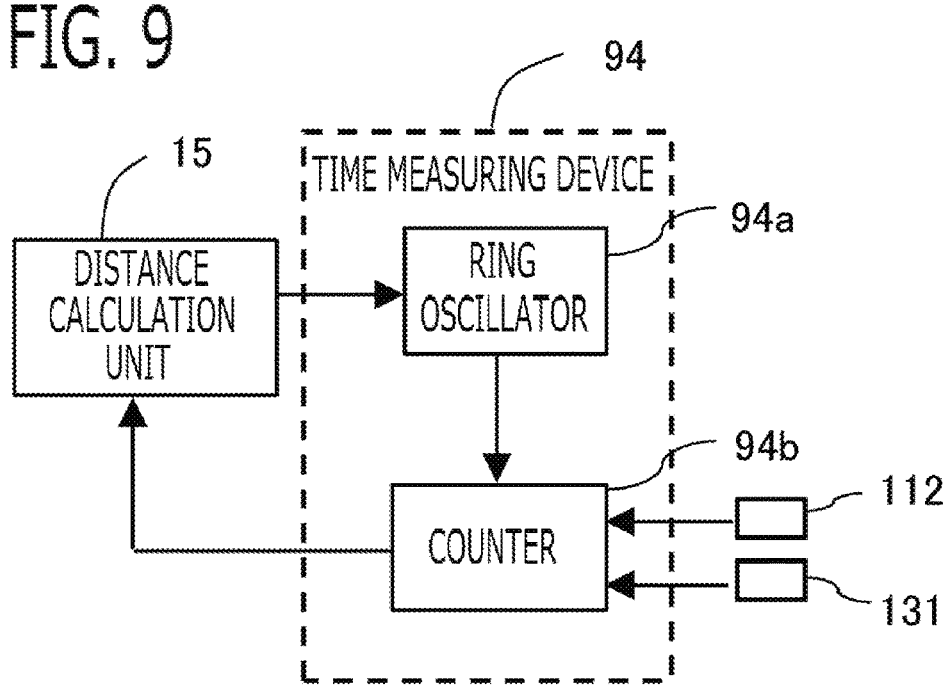
FIG. 9 is a figure showing the schematic configuration of the time measuring device according to Embodiment 1.

In the present embodiment, as shown in FIG. 9, the time measuring device 94 is provided with a ring oscillator 94a which outputs an oscillation signal, and a counter 94b which counts up rising frequency or falling frequency of the oscillation signal outputted from the ring oscillator 94a. The ring oscillator 94a outputs the oscillation signal which oscillates at the commanded oscillation period. This oscillation period becomes the time resolution $\Delta t$. The counter 94b starts the count-up of the counter value, when the inputted start signal is turned ON. Then, the counter 94b outputs the counted value, when the stop signal is turned ON.

Figure 10:
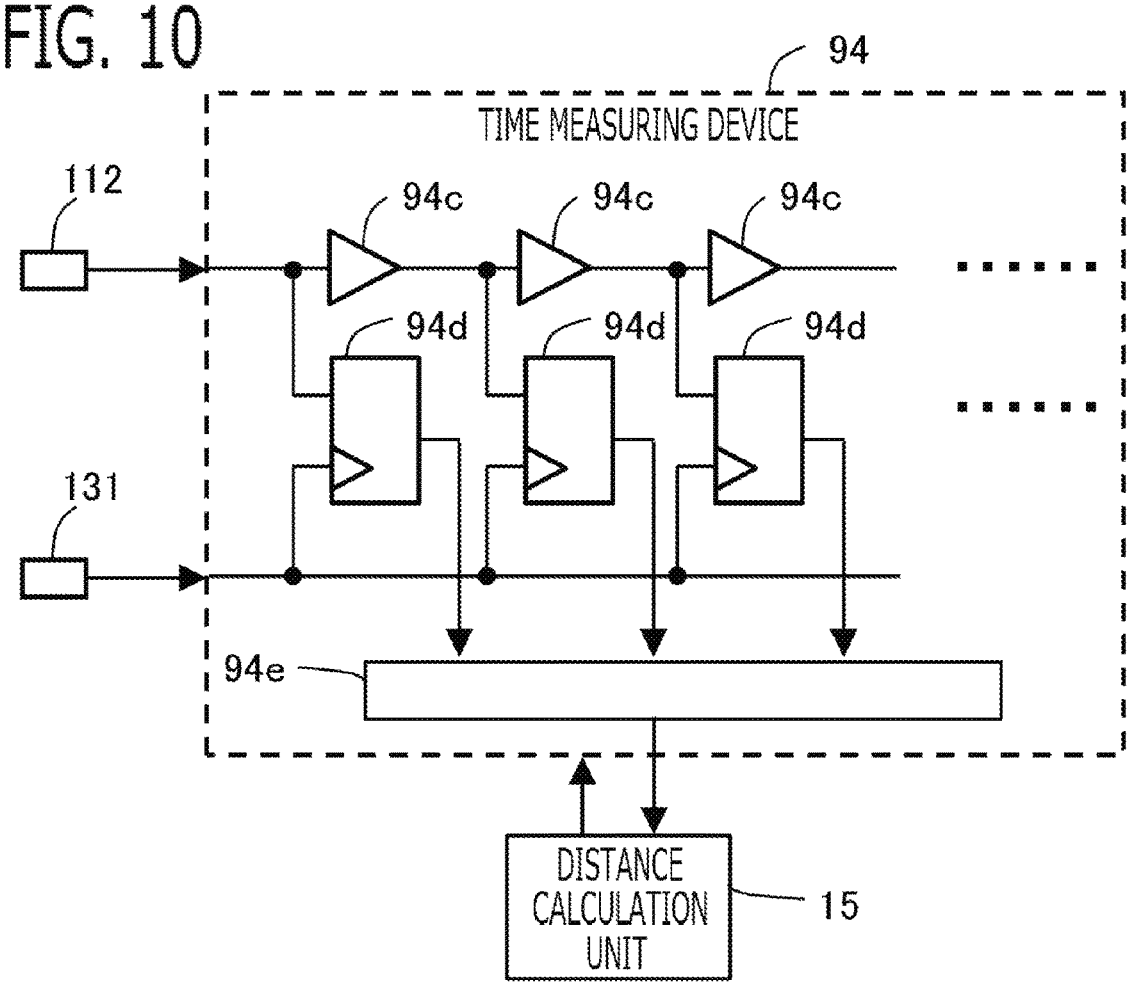
FIG. 10 is a figure showing the schematic configuration of the time measuring device according to Embodiment 1.

Alternatively, the time measuring device 94 may be a type provided with a plurality of delay circuits 94c and flip-flops 94d, and a counter 94e (referred to also as encoder). FIG. 10 shows an example of simple configuration. There are various variations in arrangement constitution of the delay circuit 94c and the flip-flop 94d. The start signal inputted into the time measuring device 94 sequentially transmits a plurality of delay circuits 94c connected in series. The each delay circuit 94c delays the inputted signal by the time delay $\Delta t$ commanded from the arithmetic processor 90 (the distance calculation unit 15), and outputs. Accordingly, the time delay Δt of the each delay circuit 94c becomes the time resolution of the time measuring device 94. The output signal of the each delay circuit 94c is inputted into the flip-flop 94d. When the stop signal inputted into the time measuring device 94 is turned ON, the output signal of the each flip-flop 94d is latched. The output signals of the plurality of flip-flops 94d are inputted into the counter 94e, and the counter 94e outputs the counted value according to the output signals of the plurality of flip-flops 94d.

Figure 7:
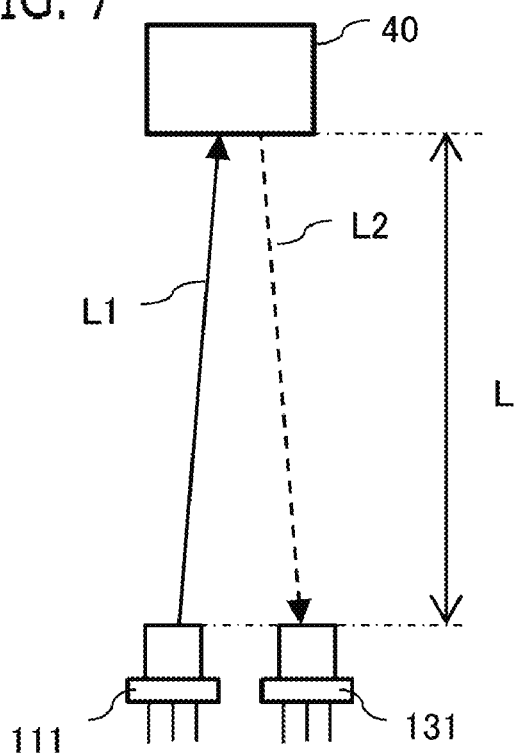
FIG. 7 is a figure for explaining detection of the distance to the body according to Embodiment 1.

As shown in FIG. 7, the laser beam L1 emitted from the laser beam source 111 is reflected by the object 40 which exists ahead by a distance L, and the reflected light L2 enters into the light detector 131 which exists backward by the distance L. FIG. 8 shows the relationship between the emission signal of the laser beam L1 emitted from the laser beam source 111, and the light receiving signal of the reflected light L2 received by the light detector 131. The time Tct (the light receiving time Tct) from the rising of the emission signal to the peak of the light receiving signal is time for the laser beam to go and return the distance L between the laser beam source 111 and the light detector 131, and the object 40. Therefore, the distance L to the object 40 can be calculated by multiplying the velocity of light c0 to the light receiving time Tct, and dividing by 2 (L=Tct×c0/2).

<Distance Calculation Unit 15>

The distance calculation unit 15 calculates a distance to the object which exists at the irradiation angle, based on the light receiving time Tct measured by the time measuring device 94.

Then, the distance calculation unit 15 calculates a value obtained by multiplying the velocity of light c0 to the light receiving time Tct, and dividing by 2, as the distance L to the object which exists at the irradiation angle at emitting the laser beam L1 (L=Tct×c0/2). When the time measuring device 94 is not outputting the light receiving time Tct, the distance calculation unit 15 determines that the object which exists at the irradiation angle at that time cannot be detected, and does not calculate the distance L. The distance calculation unit 15 transmits the calculating result of distance to the external arithmetic processing unit 31.

<Measurement Behavior of Light Receiving Time>

Figure 11:
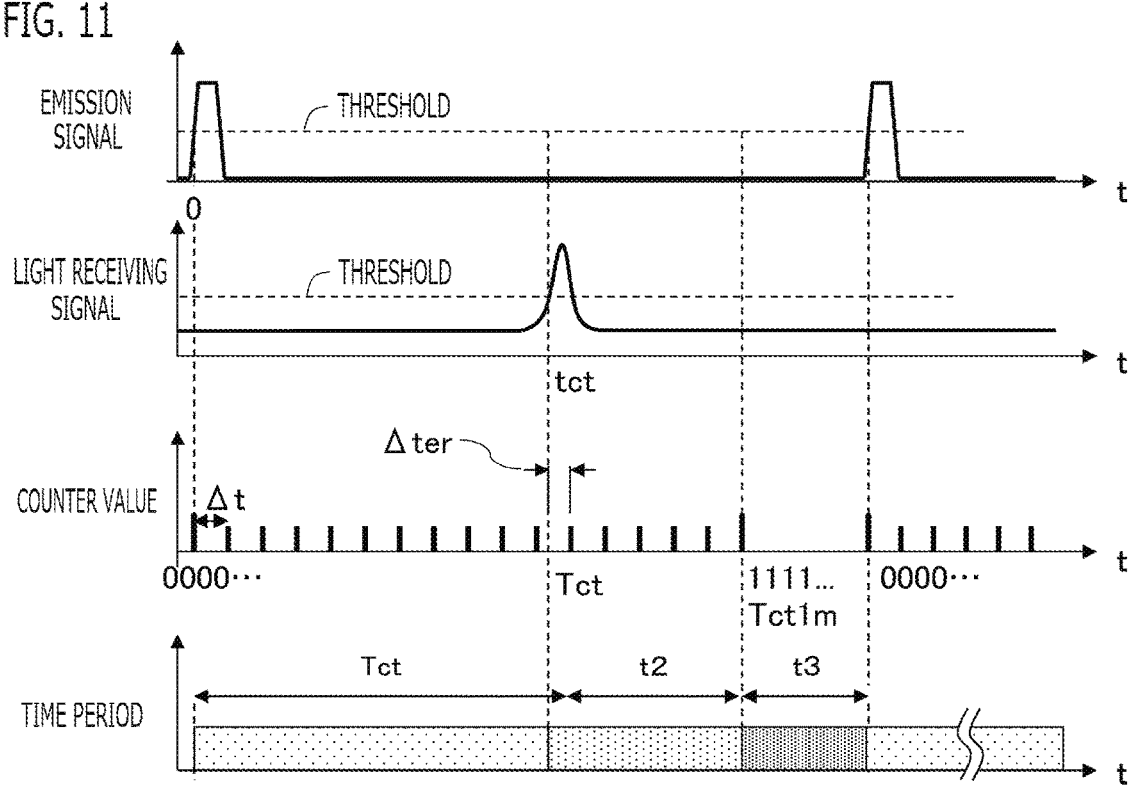
FIG. 11 is a time chart for explaining the measurement behavior of the light receiving time according to Embodiment 1.

FIG. 11 is a time chart for explaining flow of counter processing of the time measuring device 94 and data processing, from emitting the laser beam to receiving the reflected light and measuring time. The uppermost stage time chart in FIG. 11 shows time waveform of the output signal (hereinafter, referred to as an emission signal) from the laser beam source driving circuit 112 to the laser beam source 111. The second stage time chart from the top in FIG. 11 shows time waveform of the light receiving signal outputted from the light detector 131. The third stage time chart from the top in FIG. 11 shows count interval of the time measuring device 94. The lowermost stage time chart in FIG. 11 shows time period in which data processing of the counter is possible.

First, the output signal transmitted from the laser beam source driving circuit 112 to the laser beam source 111 is turned ON, and the laser beam source 111 starts emission of the laser beam. The output signal from the laser beam source driving circuit 112 to the laser beam source 111 is inputted also into the time measuring device 94. The time measuring device 94 starts count-up of the counter from 0, when the output signal of the laser beam source driving circuit 112 exceeds a threshold value at time 0.

Then, when the light detector 131 receives the reflected light, the output signal (light receiving signal) of the light detector 131 starts to increase. The output signal (light receiving signal) of the light detector 131 is inputted into the time measuring device 94. At timing (time Tct) immediately after the output signal (light receiving signal) of the light detector 131 exceeds a threshold value, the time measuring device 94 stops count-up of the counter. Then, the light detector 131 transmits binary digital data of the stopped counter value Cnt by 1 bit or plural bits to the arithmetic processor 90. This counter value Cnt corresponds to a value obtained by dividing the real light receiving time tct by count-up interval Δt which is the time resolution, and rounding up figure below decimal point of the divided value (a value rounded up below decimal point of (Tct/Δt)). A value obtained by multiplying the time resolution Δt to the counter value Cnt becomes the light receiving time Tct measured by the time measuring device 94 (Tct=Cnt×Δt). A value obtained by multiplying the time resolution Δt to a value below decimal point of tct/Δt is error Δter between the real light receiving time tct and the light receiving time Tct measured by the time measuring device 94 (Δter=(value below decimal point of tct/Δt)×Δt). Therefore, if the time resolution Δt is reduced, the error Δter is reduced and accuracy of the distance measurement is improved.

For example, the case where the objective distance is L will be considered. If the velocity of light is set to c0, the light receiving time tct until the laser beam reflects the object and returns is given by the next equation.

$$tct = 2 \times L/c0 \quad (1)$$

Accordingly, the light receiving time tct depends on the objective distance L. If the maximum measurable object distance of the laser distance measuring apparatus 10 which is determined by the intensity of the laser beam, the light receiving sensitivity of the reflected light, and the like is set to Lm, the maximum measurable light receiving time Tct1m corresponding to it is given by the next equation.

$$Tct1m = 2 \times Lm/c0 \quad (2)$$

Time obtained by subtracting tct from 2×Lm/c0 is set to t2 (t2=2×Lm/c0−tct). If the number of bits of the light receiving time Tct is set to N, and the number of transmission bits per second including signal calculation and processing time is set to B, time t3 required for transmission of the measured light receiving time Tct is given by the next equation.

$$t3 = N/B \quad (3)$$

Herein, time which can be used for data processing among the time periods shown in the lowermost stage time chart in FIG. 11 becomes t2+t3. In order to measure the distance to the maximum object distance Lm, the maximum value M of the measurement frequency per unit time is given by the next equation.

$$M = 1/(Tct+t2+t3) \quad (4)$$

Herein, Tct+t2=2×Lm/c0. The number of bits N of the counter value is given by the next equation. Herein, RoundUP1 (A) is a function which performs processing for rounding up figure below decimal point of A.

$$N = \text{RoundUP1}(\log 2(2 \times Lm/c0/\Delta t)) \quad (5)$$

Accordingly, the minimum time t3 required for transmission of the measured light receiving time Tct is given by the next equation.

$$t3 = \text{RoundUP1}(\log 2(2 \times Lm/c0/\Delta t))/B \quad (6)$$

Accordingly, the maximum value M of the measurement frequency per unit time is given by the next equation.

$$M=1/\{Tct+t2+\text{RoundUP1}(\log 2(2\times Lm/c0/\Delta t))/B\} \quad (7)$$

Accordingly, as seen from the equation (5) and the equation (7), if the time resolution $\Delta t$ is increased, since the number of bits N of the counter value can be decreased, the maximum value M of the measurement frequency per unit time can be increased.

<Relationship Between Objective Distance and Time Resolution>

Figure 12:
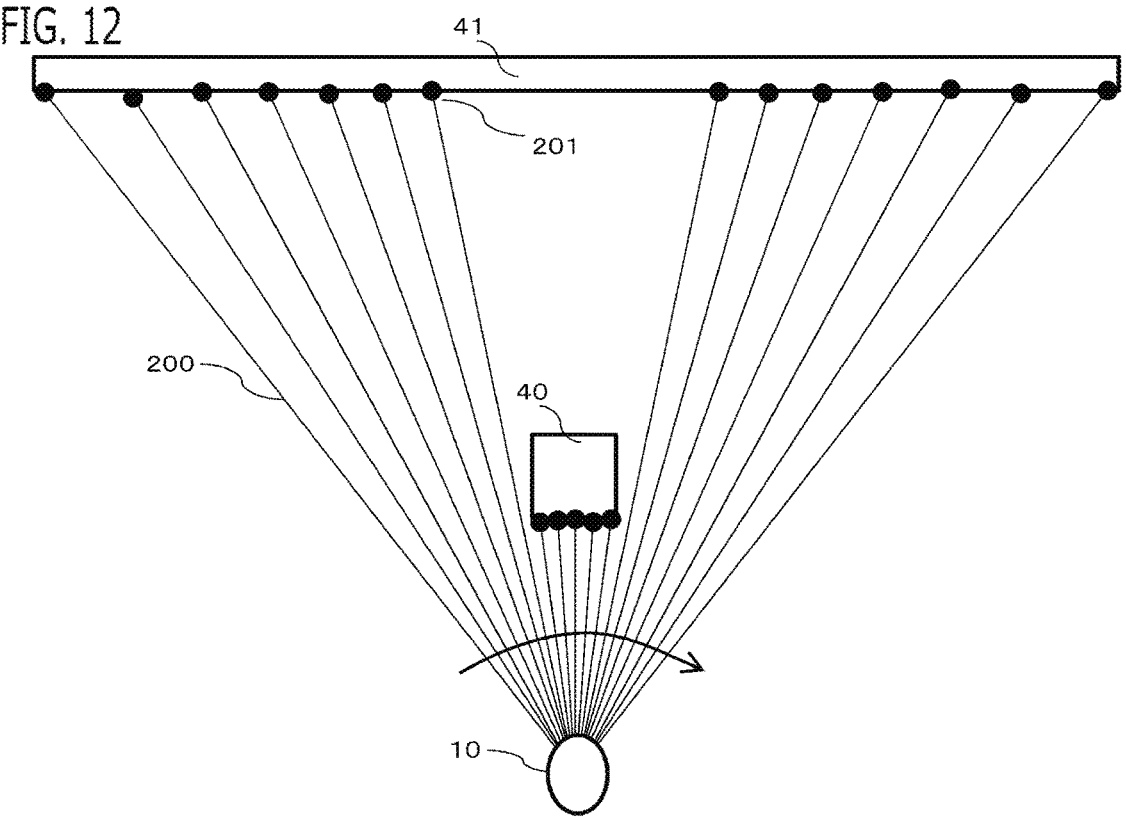
FIG. 12 is a figure for explaining the measurement behavior of the light receiving time when scanning the laser beam right and left according to Embodiment 1.

FIG. 12 shows each irradiation angle 200 when scanning the irradiation angle of the laser beam from the left to the right, and a part where the laser beam hits the object at the each irradiation angle 200, by the black dot 201. In the example of FIG. 12, there is a long distance background object 41 behind the object 40.

Figure 13:
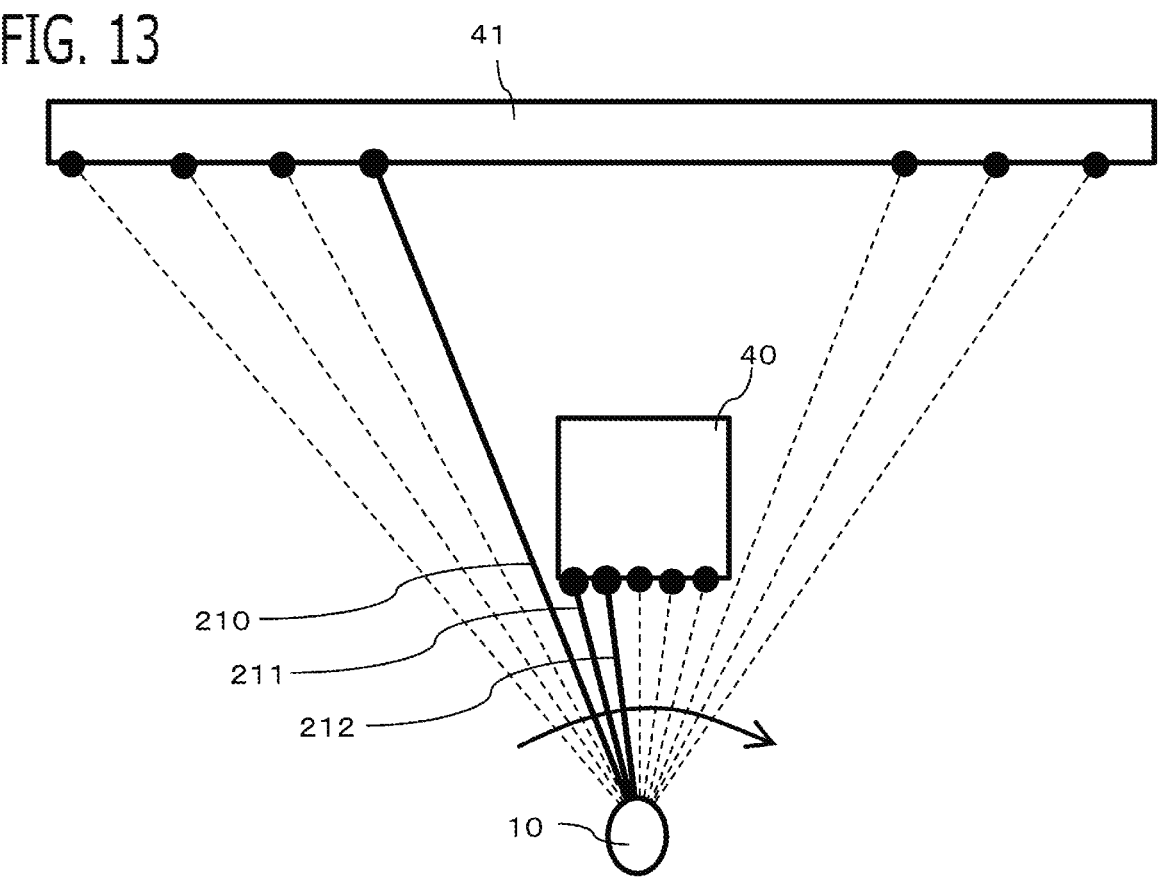
FIG. 13 is a time chart for explaining the behavior before and after the laser beam hits the short distance object according to Embodiment 1.

FIG. 13 is a figure showing before and after the laser beam hits the object 40. The laser beam is scanned in order of the irradiation angles 210, 211, 212; at 210, the laser beam hits the long distance background object 41; and at 211 and 212, the laser beam hits the object 40.

Figures 14, 15:
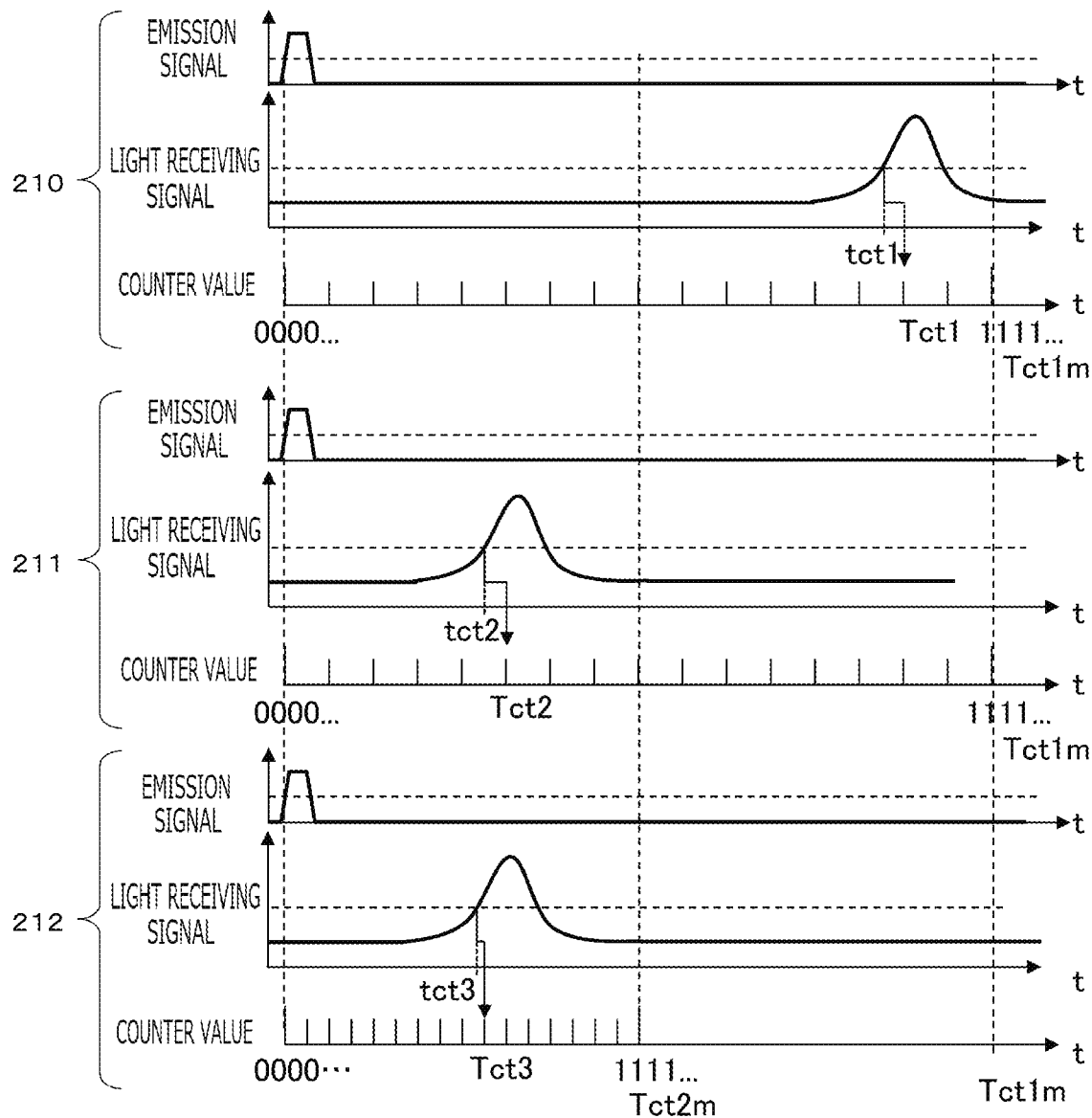
FIG. 14 is a time chart for explaining the measurement behavior of the light receiving time before and after the laser beam hits the short distance object according to Embodiment 1.
FIG. 15 is a figure for explaining the setting example of the resolution setting data according to Embodiment 1.

FIG. 14 is a time chart showing the behavior of the emission signal, the light receiving signal, and the counter value at each of the irradiation angles 210, 211, 212. In the time-axis which is a horizontal axis of the time chart of each irradiation angle 210, 211, 212, the emission time point of the laser beam is set to time 0, and the time-axes are arranged.

At the irradiation angle 210, the time resolution $\Delta t$ is set to a comparatively large value; and the maximum measurable object distance Lm of the laser distance measuring apparatus 10 and the maximum light receiving time $Tct1m$ corresponding to it are a little larger than the distance and the light receiving time of the long distance background object 41. The time resolution $\Delta t$ is $\Delta t=Tct1m/(2^N)$. When the counter value reaches the maximum value $2^N$, the count-up is stopped and the time measurement cannot be performed. A little before the counter value reaches the maximum value $2^N$, the light receiving signal exceeded the threshold and the count-up is stopped. This real light receiving time exceeding the threshold is set to tct1. On the other hand, since the stopped counter value is an integer, the light receiving time Tct1 measured by the counter value becomes an integral multiple of the time resolution $\Delta t$. A measurement error $\Delta ter1$ between the real light receiving time tct1 and the light receiving time Tct measured by the counter becomes $\Delta ter1=Tct1-tct1$. Therefore, a measurement error $\Delta L1$ of distance are $\Delta L1=\Delta ter1 \times c0/2$.

The time resolution $\Delta t$ at the irradiation angle 211 is set to be the same as the irradiation angle 210. Since the laser beam is reflected by the object 40 positioned closer than the long distance background object 41, the light receiving signal exceeds the threshold long before the counter value reaches the maximum value $2^N$, and the count-up is stopped. The counter value is shown in the figure by binary, and the maximum value is shown by "1111 . . . ". Accordingly, the real light receiving time tct2 at the irradiation angle 211 is smaller than real light receiving time tct1 at the irradiation angle 210 (tct2<tct1). The measurement error $\Delta ter2$ between the real light receiving time tct2 and the light receiving time Tct2 measured by the counter becomes $\Delta ter2=Tct2-tct2$.

Both the maximum value of error $\Delta ter1$ at the irradiation angle 210 and the maximum value of error $\Delta ter2$ at the irradiation angle 211 are $\Delta t$. Accordingly, as the objective distance becomes short with respect to the maximum object distance at the set time resolution, the ratio of the measurement error to the true distance becomes large, and the measurement accuracy is reduced. On the other hand, if the objective distance becomes longer than the maximum object distance, it becomes impossible to measure the distance. Therefore, within a range where the objective distance does not become longer than the maximum object distance, by adjusting the time resolution $\Delta t$ so that the maximum object distance approaches the objective distance, the ratio of the measurement error to the true value can be reduced.

On the other hand, the time resolution $\Delta t$ at the irradiation angle 212 is set to a half of the irradiation angle 210 and the irradiation angle 211. Accordingly, each of the maximum object distance and the maximum light receiving time $Tct2m$ becomes a half of the irradiation angle 210 and the irradiation angle 211. Accordingly, the maximum value of error $\Delta ter3$ of the irradiation angle 212 becomes a half of the maximum value of error $\Delta ter1$ of the irradiation angle 210 and the maximum value of error $\Delta ter2$ of the irradiation angle 211. Accordingly, the ratio of the measurement error to the true distance can be reduced to a half of the irradiation angle 211. Since the maximum value of the counter value is the same $2^N$, the count-up is stopped at the half time of the irradiation angle 210 and the irradiation angle 211. However, since the distance of the object 40 is within the range of the maximum object distance, the light receiving time is measured. Therefore, by reducing the time resolution $\Delta t$, without increasing the data amount (number of bits N) outputted from the time measuring device 94, the distance of the object 40 located at the short distance can be measured with good accuracy.

That is to say, by reducing the time resolution $\Delta t$ of the time measuring device 94 when the object exists at the short distance, and enlarging the time resolution $\Delta t$ when the object exists at the long distance, with a small data amount, the distance of the short distance object can be measured with good accuracy, and the distance of the long distance object can be measured. Therefore, an increase of the time t3 required for data transfer can be suppressed, and the measurement frequency per unit time can be increased.

<Change of Time Resolution by distance calculation unit 15>

Then, the distance calculation unit 15 changes the time resolution $\Delta t$ of the time measuring device 94 used for calculation of the object distance, based on the light receiving time Tct as detection information. The distance calculation unit 15 enlarges the time resolution $\Delta t$ as the measured light receiving time Tct becomes long. Instead of the measured light receiving time Tct, the object distance which has a proportional relation with the light receiving time Tct may be used.

According to this configuration, by reducing the time resolution $\Delta t$ of the time measuring device 94 when the object exists at the short distance, and enlarging the time resolution $\Delta t$ when the object exists at the long distance, the distance of the short distance object can be measured with good accuracy, and the distance of the long distance object can be measured.

The data amount which is outputted from the time measuring device 94 and represents the light receiving time Tct does not vary. In the present embodiment, the time measuring device 94 transmits the counter value of fixed number of bits N by 1 bit or plural bits to the arithmetic processor 90 (the distance calculation unit 15) by serial communication or parallel communication.

According to this configuration, the distance of the short distance object and the long distance object can be measured with the same smallest possible data amount. For example, even if the distance of the long distance object is measured, increase in time required for data transfer can be suppressed, and the measurement frequency per unit time can be increased.

When the time measuring device 94 could not measure the light receiving time Tct, the distance calculation unit 15 enlarges the time resolution Δt. In the present embodiment, when the time measuring device 94 could not measure the light receiving time Tct, the distance calculation unit 15 sets the time resolution Δt to the maximum value. If the time resolution Δt is reduced, the maximum measurable light receiving time and the maximum object distance become short, the time measuring device 94 cannot detect the object further than the maximum object distance, and there are cases where the light receiving time Tct cannot be measured. In that case, by enlarging the time resolution Δt, the maximum measurable light receiving time and the maximum object distance can be extended, and the light receiving time Tct of the long distant object can be measured.

In the present embodiment, as the example of FIG. 14, the distance calculation unit 15 changes the time resolution Δt at this time measurement, based on the light receiving time Tct measured immediately before. As the example of FIG. 14, when measuring at the irradiation angle 211, since the light receiving time Tct measured at the preceding irradiation angle 210 is long, the time resolution Δt when measuring at the irradiation angle 211 is set to a large value. When measuring at the irradiation angle 212, since the light receiving time Tct measured at the preceding irradiation angle 211 is short, the time resolution Δt when measuring at the irradiation angle 212 is set to a small value. According to the preceding measurement result, the time resolution Δt can be optimized adaptively.

In the present embodiment, by referring to a resolution setting data in which setting value of the time resolution Δt is preliminarily set in each of a plurality of divided regions in which a possible range of the light receiving time is divided, the distance calculation unit 15 sets the time resolution Δt of the divided region corresponding to the measured light receiving time Tct. The distance calculation unit 15 step wisely enlarges the time resolution Δt as the measured light receiving time Tct becomes long.

In the present embodiment, as shown in FIG. 15, the resolution setting data is divided into two regions. Specifically, in the resolution setting data, the range from 0 to the maximum measurable light receiving time Tct1$m$ by the laser distance measuring apparatus 10 is divided into the first region R1 and the second region R2. A first time resolution Δt1 is preliminarily set in the first region R1, and a second time resolution Δt2 is preliminarily set in the second region R2. A region where the light receiving time Tct is less than or equal to a boundary value Tct2$m$ is the second region R2, and a region where the light receiving time Tct is larger than the boundary value Tct2$m$ is the first region R1. That is to say, a region where the light receiving time Tct is from 0 to the boundary value Tct2$m$ is the second region R2, and a region where the light receiving time Tct is from the boundary value Tct2$m$ to the maximum light receiving time Tct1$m$ is the first region R1.

The second time resolution Δt2 is set to a value smaller than the first time resolution Δt1. When the measured light receiving time Tct is less than or equal to the boundary value Tct2$m$, the distance calculation unit 15 determines that the region is the second region R2, and sets the second time resolution Δt2 to the time resolution Δt of the time measuring device 94. When the measured light receiving time Tct is larger than the boundary value Tct2$m$, the distance calculation unit 15 determines that the region is the first region R1, and sets the first time resolution Δt1 to the time resolution Δt of the time measuring device 94.

In the example of FIG. 15, the boundary value Tct2$m$ is set to a half value of the maximum measurable light receiving time Tct1$m$, and the second time resolution Δt2 is set to a half value of the first time resolution Δt1. As shown in the equation (2), the maximum light receiving time Tct1$m$ is set to a value obtained by dividing a double value of the measurable maximum object distance Lmin of the laser distance measuring apparatus 10 by the velocity of light c0 (Tct1$m$=2×Lm/c0). And, the first time resolution Δt1 is set to Δt1=Tct1$m$/($2^N$). The setting value of the boundary value Tct2$m$ and the setting value of the second time resolution Δt2 may be set to any values. A region number may be set to a larger number than 2.

<Flowchart>

Figure 16:
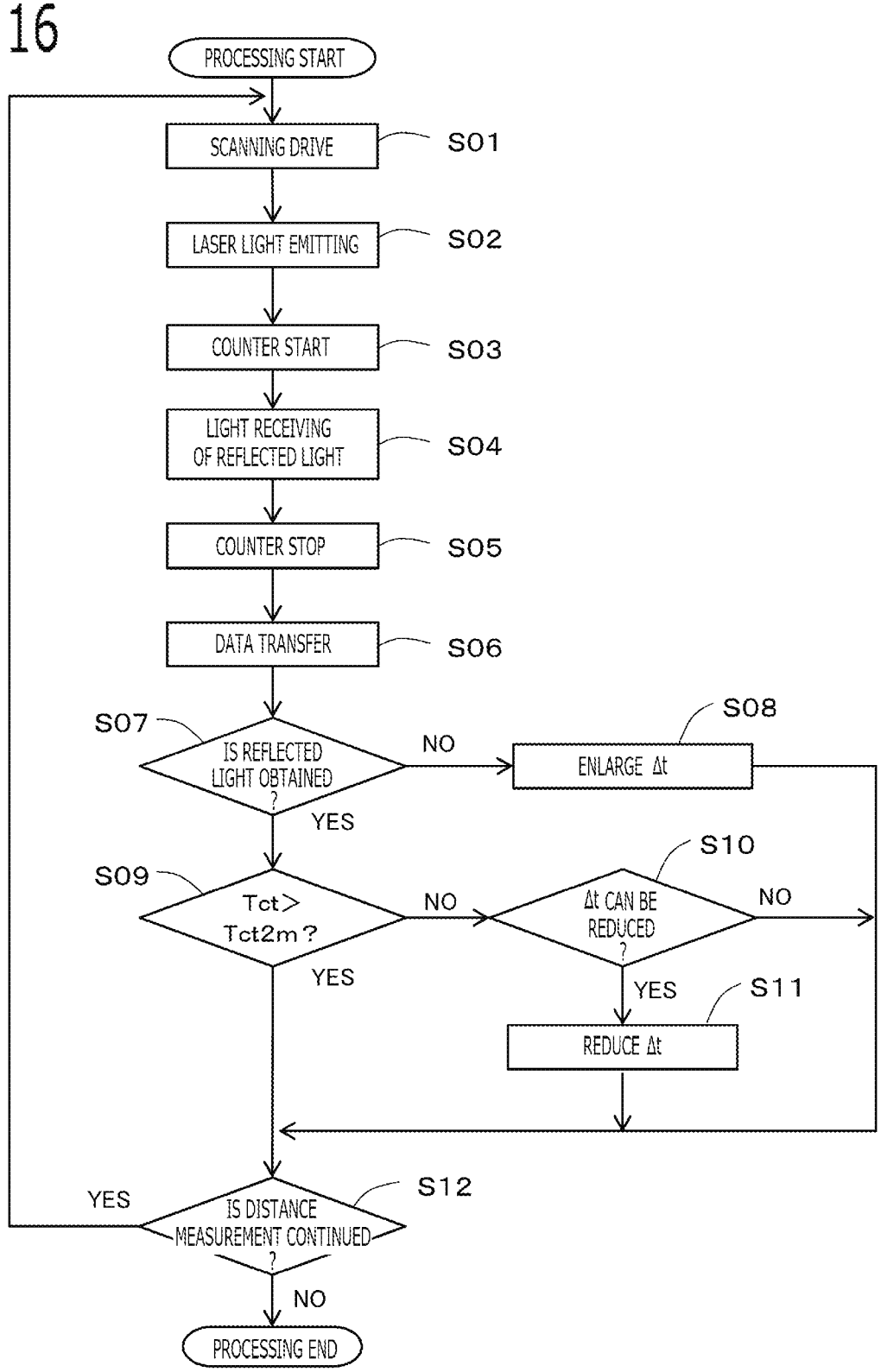
FIG. 16 is a flowchart for explaining processing of the distance measurement according to Embodiment 1.

Processing will be explained using the flowchart of FIG. 16. When processing is started, in the step S01, the scanning control unit 14 controls the scanning mechanism 12 to scan the irradiation angle of the laser beam. Then, in the step S02, the light transmission and reception control unit 16 transmits the command signal to the laser beam source driving circuit 112 to emit the pulse form laser beam of the pulse cycle Tp. In the step S03, when the output signal from the laser beam source driving circuit 112 to the laser beam source 111 exceeds the threshold value, the time measuring device 94 starts the count-up of the counter value. In the step S04, the light receiving unit 13 outputs the light receiving signal when receiving the reflected light. In the step S05, the time measuring device 94 stops the count-up, when the light receiving signal outputted from the light receiving unit 13 exceeds the threshold.

Then, in the step S06, the time measuring device 94 transmits the counter value Cnt to the arithmetic processor 90 (the distance calculation unit 15). The distance calculation unit 15 calculates the light receiving time Tct by multiplying the time resolution Δt to the counter value Cnt (Tct=Cnt×Δt). The distance calculation unit 15 calculates the object distance which is the distance to the object, based on the light receiving time Tct.

In the step S07, when the counter value Cnt cannot be received even if the maximum light receiving time obtained by multiplying the maximum value $2^N$ of the counter to the time resolution Δt elapses, the distance calculation unit 15 determines that the light receiving unit 13 cannot receive the reflected light because the object does not exist at the irradiation angle, or because the object does not exist within the range of the maximum object distance according to the time resolution Δt, and advances to the step S08. When the counter value Cnt is received, the distance calculation unit 15 determines that the light receiving unit 13 received the reflected light, and advances to the step S09.

When determining that the reflected light cannot be received (the step S07: No), the distance calculation unit 15 enlarges the time resolution Δt used for next measurement in the step S08. In the present embodiment, the distance calculation unit 15 sets the time resolution Δt to the first time resolution Δt1 which is the maximum value. When the object is far in a state where the time resolution Δt is small, the light receiving time Tct cannot be obtained, since time until the reflected light returns becomes longer than the measurable maximum time. Therefore, in this case, by enlarging the time resolution Δt and performing next measurement, the distance of the long distant object can be measured.

On the other hand, when determining that the reflected light can be received (the step S07: Yes), the distance calculation unit 15 determines whether or not the light receiving time Tct is larger than the boundary value Tct2$m$ in the step S09. When determining that it is larger, the distance calculation unit 15 advances to the step S12, and when determining that it is not larger, the distance calculation unit 15 advances to the step S10. When determining that the light receiving time Tct is not larger than the boundary value Tct2$m$ (the step S09: No), the distance calculation unit 15 determines whether or not the time resolution Δt can be reduced in the step S10. When determining that it can be reduced, the distance calculation unit 15 advances to the step S11, and when determining that it cannot be reduced, the distance calculation unit 15 advances to the step S12.

In the present embodiment, when the current time resolution Δt is the first time resolution Δt1, the distance calculation unit 15 determines that the time resolution Δt can be reduced. When the current time resolution Δt is the second time resolution Δt2, the distance calculation unit 15 determines that the time resolution Δt cannot be reduced. When determining that it can be reduced (the step S10: Yes), the distance calculation unit 15 reduces the time resolution Δt in the step S11. In the present embodiment, the distance calculation unit 15 sets the time resolution Δt to the second time resolutions Δt2. In the step S12, when continuing the distance measurement, the distance calculation unit 15 returns to the step S01 to continue processing. When not continuing the distance measurement, the distance calculation unit 15 ends a series of processing.

2. Embodiment 2

Next, the laser distance measuring apparatus 10 according to Embodiment 2 will be explained. The explanation for constituent parts the same as those in Embodiment 1 will be omitted. The basic configuration of the laser distance measuring apparatus 10 according to the present embodiment is the same as that of Embodiment 1; however, Embodiment 2 is different from Embodiment 1 in a changing method of the time resolution Δt of the distance calculation unit 15.

In the present embodiment, as similar to Embodiment 1, the distance calculation unit 15 changes the time resolution Δt of the time measuring device 94 used for calculation of the object distance, based on the light receiving time Tct as detection information. The distance calculation unit 15 enlarges the time resolution Δt as the measured light receiving time Tct becomes long. When the time measuring device 94 could not measure the light receiving time Tct, the distance calculation unit 15 enlarges the time resolution Δt. By referring to a resolution setting data in which setting value of the time resolution Δt is preliminarily set in each of a plurality of divided regions in which a possible range of the light receiving time is divided, the distance calculation unit 15 sets the time resolution Δt of the divided region corresponding to the measured light receiving time Tct.

In the present embodiment, unlike Embodiment 1, the distance calculation unit 15 changes the time resolution Δt at this time measurement, based on the light receiving time Tct measured at the irradiation angle of the last time scanning period (frame) corresponding to the irradiation angle of this time measurement.

According to this configuration, once the object distance is detected at each irradiation angle, after the next scanning period (frame), the time resolution Δt at each irradiation angle is made appropriate, and the detection accuracy of the object distance can be improved.

Figure 17:
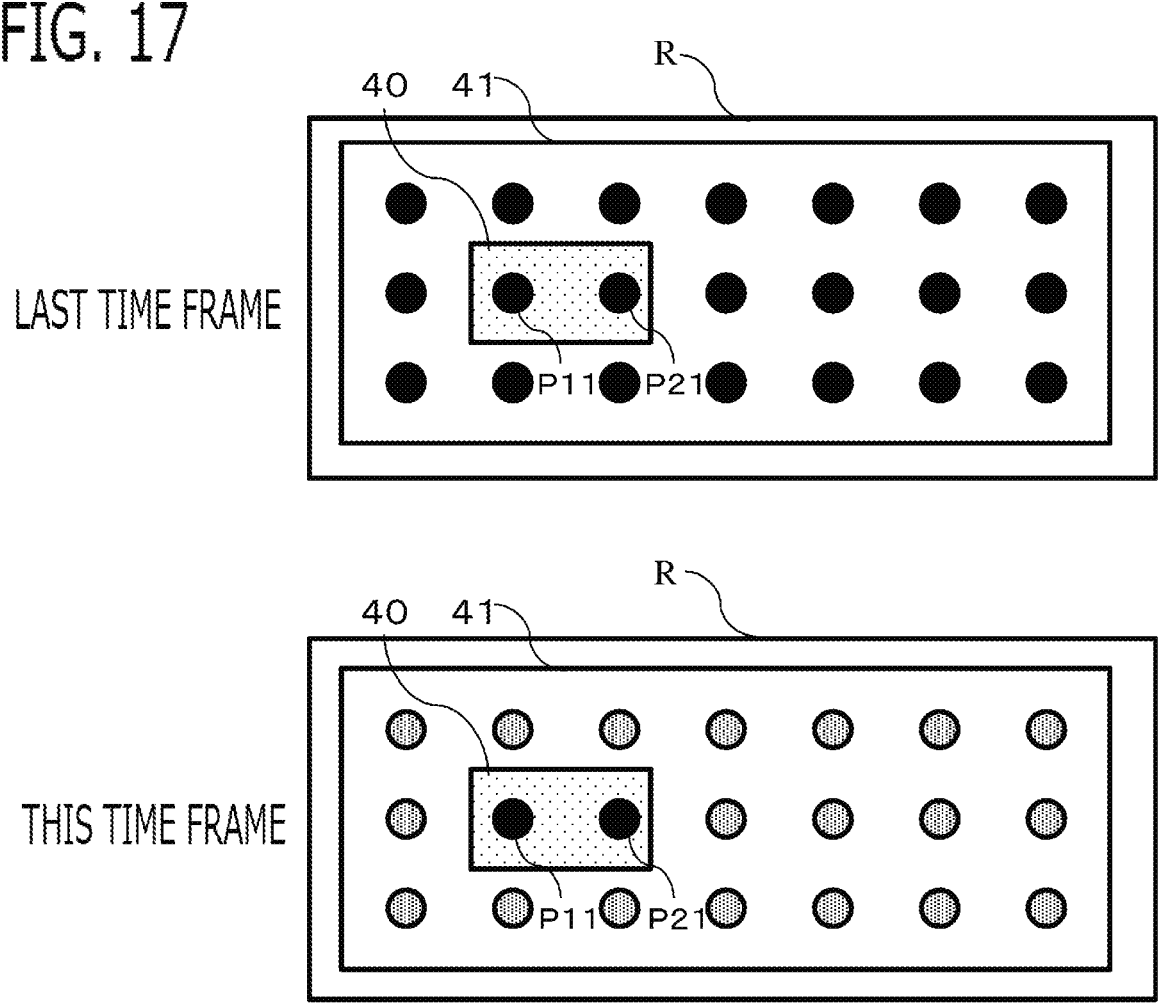
FIG. 17 is a figure showing the measurement points in one frame according to Embodiment 2.

In the figures of the upper stage and the lower stage of FIG. 17, a plurality of irradiation angles at which the distance are measured in the same frame are shown by dots. The distance calculation unit 15 sets the time resolution Δt used in the next measurement, based on the light receiving time Tct measured at each irradiation angle, and stores the next time resolution Δt to the storage apparatus 91 such as RAM, by correlating with the irradiation angle.

In the figure of the upper stage of FIG. 17, at each of the irradiation angle P11 and the irradiation angle P21, the light receiving time Tct of the object 40 disposed comparatively close is measured. Since the light receiving time Tct is smaller than the boundary value Tct2$m$, the next time resolution Δt is set to a small value (in this example, the second time resolution Δt2), setting information (flag information and the like) is stored to the storage apparatus 91 such as RAM, by correlating with each of the irradiation angle P11 and the irradiation angle P21.

On the other hand, at each of the irradiation angles other than P11 and P12, the light receiving time Tct of the object 41 disposed comparatively far is measured. Since the light receiving time Tct is larger than the boundary value Tct2$m$, the next time resolution Δt is set to a large value (in this example, the first time resolution Δt1), setting information (flag information and the like) is stored to the storage apparatus 91 such as RAM, by correlating with each of the irradiation angles other than the irradiation angle P11 and the irradiation angle P21.

Then, the figure of the lower stage of FIG. 17 shows the next frame. At each irradiation angle, the distance calculation unit 15 reads the setting information of the time resolution of the corresponding irradiation angle, which was set in the last time frame, from the storage apparatus 91, and sets it to the time resolution Δt used in this time measurement.

<Flowchart>

Figure 18:
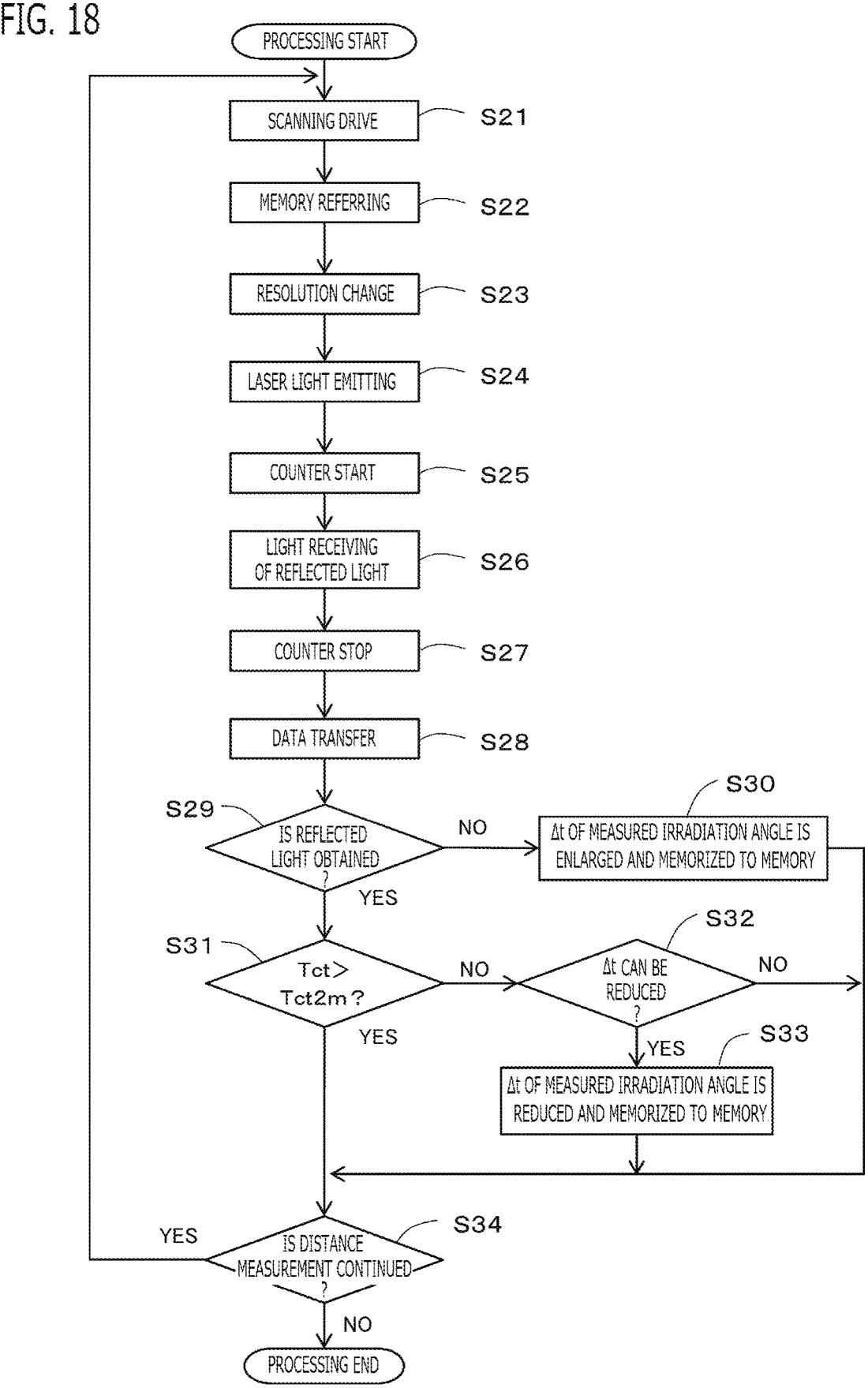
FIG. 18 is a flowchart for explaining processing of the distance measurement according to Embodiment 2.

Processing will be explained using the flowchart of FIG. 18. When processing is started, in the step S21, the scanning control unit 14 controls the scanning mechanism 12 to scan the irradiation angle of the laser beam. Then, in the step S22, the distance calculation unit 15 reads the setting information of the time resolution of the corresponding irradiation angle determined in the last time frame, from the storage apparatus 91. Then, in the step S23, the distance calculation unit 15 transmits the time resolution Δt corresponding to the read setting information, to the time measuring device 94.

In the step S24, the light transmission and reception control unit 16 transmits the command signal to the laser beam source driving circuit 112 to output the pulse form laser beam of the pulse cycle Tp. In the step S25, when the output signal from the laser beam source driving circuit 112 to the laser beam source 111 exceeds the threshold value, the time measuring device 94 starts the count-up of the counter value Cnt, at a time interval of the time resolution Δt transmitted in the step S23.

In the step S26, the light receiving unit 13 outputs the light receiving signal when receiving the reflected light. In the step S27, the time measuring device 94 stops the count-up, when the light receiving signal outputted from the light receiving unit 13 exceeds the threshold. Then, in the step S28, the time measuring device 94 transmits the counter value Cnt to the arithmetic processor 90 (the distance calculation unit 15). The distance calculation unit 15 calculates the light receiving time Tct by multiplying the time resolution Δt to the counter value Cnt. The distance calculation unit 15 calculates the object distance which is the distance to the object, based on the light receiving time Tct.

In the step S29, when the counter value Cnt cannot be received even if the maximum light receiving time obtained by multiplying the maximum value $2^N$ of the counter to the time resolution $\Delta t$ elapses, the distance calculation unit 15 determines that the light receiving unit 13 cannot receive the reflected light because the object does not exist at the irradiation angle, or because the object does not exist within the range of the maximum object distance according to the time resolution $\Delta t$, and advances to the step S30. When the counter value Cnt is received, the distance calculation unit 15 determines that the light receiving unit 13 received the reflected light, and advances to the step S31.

When determining that the reflected light cannot be received (the step S29: No), the distance calculation unit 15 enlarges the time resolution $\Delta t$ used for the next frame in the step S30. In the present embodiment, the distance calculation unit 15 sets the time resolution $\Delta t$ to the first time resolution $\Delta t1$ which is the maximum value. Then, the distance calculation unit 15 stores the setting information of the time resolution $\Delta t$ to the storage apparatus 91 such as RAM, by correlating with this time irradiation angle.

On the other hand, when determining that the reflected light can be received (the step S29: Yes), the distance calculation unit 15 determines whether or not the light receiving time Tct is larger than the boundary value Tct2$m$ in the step S31. When determining that it is larger, the distance calculation unit 15 advances to the step S34, and when determining that it is not larger, the distance calculation unit 15 advances to the step S32. When determining that the light receiving time Tct is not larger than the boundary value Tct2$m$ (the step S31: No), the distance calculation unit 15 determines whether or not the time resolution $\Delta t$ can be reduced in the step S32. When determining that it can be reduced, the distance calculation unit 15 advances to the step S33, and when determining that it cannot be reduced, the distance calculation unit 15 advances to the step S34.

In the present embodiment, when the current time resolution $\Delta t$ is the first time resolution $\Delta t1$, the distance calculation unit 15 determines that the time resolution $\Delta t$ can be reduced. When the current time resolution $\Delta t$ is the second time resolution $\Delta t2$, the distance calculation unit 15 determines that the time resolution $\Delta t$ cannot be reduced. When determining that it can be reduced (the step S32: Yes), the distance calculation unit 15 reduces the time resolution $\Delta t$ in the step S33. In the present embodiment, the distance calculation unit 15 sets the time resolution $\Delta t$ to the second time resolutions $\Delta t2$. Then, the distance calculation unit 15 stores the setting information of the time resolution $\Delta t$ to the storage apparatus 91 such as RAM, by correlating with this time irradiation angle. In the step S34, when continuing the distance measurement, the distance calculation unit 15 returns to the step S21 to continue processing. When not continuing the distance measurement, the distance calculation unit 15 ends a series of processing.

3. Embodiment 3

Next, the laser distance measuring apparatus 10 according to Embodiment 3 will be explained. The explanation for constituent parts the same as those in Embodiment 1 will be omitted. The basic configuration of the laser distance measuring apparatus 10 according to the present embodiment is the same as that of Embodiment 1; however, Embodiment 3 is different from Embodiment 1 in a changing method of the time resolution $\Delta t$ of the distance calculation unit 15.

In the present embodiment, as similar to Embodiment 1, the distance calculation unit 15 changes the time resolution $\Delta t$ of the time measuring device 94 used for calculation of the object distance, based on the light receiving time Tct as detection information. The distance calculation unit 15 enlarges the time resolution $\Delta t$ as the measured light receiving time Tct becomes long. When the time measuring device 94 could not measure the light receiving time Tct, the distance calculation unit 15 enlarges the time resolution $\Delta t$.

In the present embodiment, unlike Embodiment 1, the distance calculation unit 15 changes the time resolution $\Delta t$ so that a value obtained by adding a margin time $\Delta Tmg$ to the measured light receiving time Tct becomes a maximum measurable light receiving time. For example, as shown in the equation (8), the distance calculation unit 15 sets, to the time resolution $\Delta t$, a value obtained by dividing a value obtained by adding the margin time $\Delta Tmg$ to the measured light receiving time Tct, by the maximum counter value $2^N$. Alternatively, as shown in the equation (9), the distance calculation unit 15 may set, to the time resolution $\Delta t$, a value obtained by dividing a value obtained by multiplying a margin coefficient Km to the light receiving time Tct, by the maximum counter value $2^N$. Herein, the margin coefficient Km is set to a larger value than 1, (Km−1) ×Tct corresponds to the margin time $\Delta Tmg$. The time resolution $\Delta t$ is upper-limited by a value obtained by dividing the light receiving time Tct1$m$ corresponding to the maximum measurable object distance Lm of the laser distance measuring apparatus 10 by the maximum counter value $2^N$.

$$\Delta t = (Tct + \Delta Tmg)/(2^N) \tag{8}$$

$$\Delta t = Km \times Tct/(2^N) \tag{9}$$

According to this configuration, the optimal time resolution $\Delta t$ can be set adaptively according to the measured light receiving time Tct, and even if the objective distance varies, the accuracy of distance measurement can be maintained.

Figure 19:
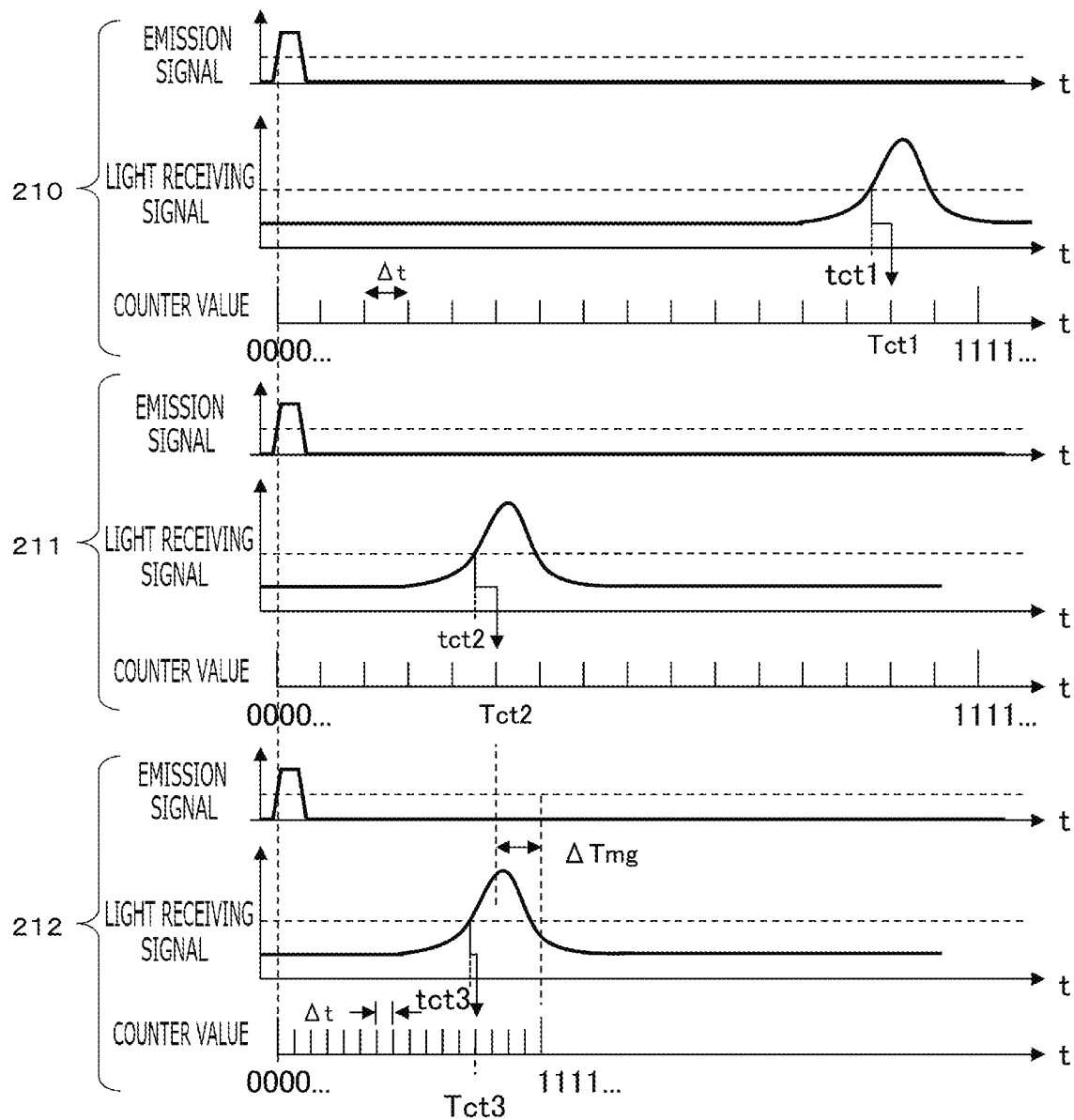
FIG. 19 is a time chart for explaining the measurement behavior of the light receiving time according to Embodiment 3.

FIG. 19 shows a behavior when changing the time resolution $\Delta t$ under the same conditions as FIG. 14 of Embodiment 1. The distance calculation unit 15 changes the time resolution $\Delta t$ at this time measurement, based on the light receiving time Tct measured immediately before. The time resolution $\Delta t$ set at the irradiation angle 212 of FIG. 19 is set to a value obtained by dividing a value obtained by adding the margin time $\Delta Tmg$ to the light receiving time Tct measured at the preceding irradiation angle 211, by the maximum counter value $2^N$.

Like Embodiment 2, the distance calculation unit 15 may change the time resolution $\Delta t$ at this time measurement, based on the light receiving time Tct measured at the irradiation angle of the last time scanning period (frame) corresponding to the irradiation angle of this time measurement.

4. Embodiment 4

Next, the laser distance measuring apparatus 10 according to Embodiment 4 will be explained. The explanation for constituent parts the same as those in Embodiment 1 will be omitted. The basic configuration of the laser distance measuring apparatus 10 according to the present embodiment is the same as that of Embodiment 1; however, Embodiment 4 is different from Embodiment 1 in providing a plurality of time measuring devices 94.

In the present embodiment, a plurality of the time measuring devices 94 in which the time resolutions are different with each other are provided. The distance calculation unit 15 selects the one time measuring device 94 used for this time measurement, from the plurality of time measuring devices 94, based on the measured light receiving time Tct. By selecting the time measuring device used for measurement of the light receiving time Tct, the time resolution of the time measuring device used for calculation of the object distance varies. The distance calculation unit 15 calculates the object distance based on the measurement result of the light receiving time Tct of the one selected time measuring device. The distance calculation unit 15 enlarges the time resolution $\Delta t$ of the time measuring device to be selected, as the measured light receiving time Tct becomes long.

According to this configuration, the measurement accuracy of the object distance can be improved using a plurality of inexpensive time measuring devices which have the fixed time resolution.

As similar to Embodiment 1, the distance calculation unit 15 changes the time resolution $\Delta t$ of the time measuring device to be selected, based on the light receiving time Tct measured immediately before. Alternatively, as similar to Embodiment 2, the distance calculation unit 15 changes the time resolution $\Delta t$ of the time measuring device to be selected, based on the light receiving time Tct measured at the irradiation angle of the last time frame corresponding to the irradiation angle of this time measurement.

For example, the first time measuring device and the second time measuring device are provided. The first time resolution $\Delta t1$ which is set in the first time measuring device and the second time resolution $\Delta t2$ which is set in the second time measuring device are set to different values with each other.

As similar to Embodiment 1, the first time resolution $\Delta t1$ is set to a value obtained by dividing the maximum light receiving time Tct1$m$ corresponding to the maximum measurable object distance Lm of the laser distance measuring apparatus 10, by the maximum counter value $2^N$ ($\Delta t1=$Tct1$m/2^N$). The second time resolution $\Delta t2$ is set to a value smaller than the first time resolution $\Delta t1$.

When the measured light receiving time Tct is greater than or equal to the boundary value Tct2$m$, the distance calculation unit 15 selects the first time measuring device as the time measuring device used for this time measurement. When the measured light receiving time Tct is smaller than the boundary value Tct2$m$, the distance calculation unit 15 selects the second time measuring device as the time measuring device used for this time measurement. The boundary value Tct2$m$ is set to a value obtained by multiplying the maximum counter value $2^N$ to the second time resolution $\Delta t2$. Then, the distance calculation unit 15 calculates, as the light receiving time Tct, a value obtained by multiplying the time resolution of the selected time measuring device, to the counter value which is outputted by the time measuring device selected by the distance calculation unit 15. Then, the distance calculation unit 15 calculates the object distance, based on the measurement result of the light receiving time Tct.

5. Embodiment 5

Next, the laser distance measuring apparatus 10 according to Embodiment 5 will be explained. The explanation for constituent parts the same as those in Embodiment 1 will be omitted. The basic configuration of the laser distance measuring apparatus 10 according to the present embodiment is the same as that of Embodiment 1; however, Embodiment 5 is different from Embodiment 1 in providing a plurality of time measuring devices 94.

In the present embodiment, a plurality of the time measuring devices 94 in which the time resolutions are different with each other are provided. Then, the distance calculation unit 15 selects the one measurement result of the light receiving time used for calculation of the object distance, from the plurality of the measurement results of the light receiving time Tct which are measured by the plurality of time measuring devices 94. By selecting one from the plurality of the measurement results of the light receiving time Tct, the time resolution of the time measuring device used for calculation of the object distance varies. Then, the distance calculation unit 15 calculates the object distance based on the measurement result of the one light receiving time Tct selected by the distance calculation unit 15.

According to this configuration, the optimal measurement result is selected from the plurality of the measurement results of light receiving time. Therefore, since the light receiving time using appropriately selected time resolution can be measured from the first detection time of the object at each irradiation angle, the distance measurement precision of the short distance object can be improved, and the distance of the long distance object can be measured. Cost can be reduced by using the plurality of inexpensive time measuring devices which have fixed time resolution.

In the present embodiment, the first time measuring device and the second time measuring device are provided. The first time resolution $\Delta t1$ which is set in the first time measuring device and the second time resolution $\Delta t2$ which is set in the second time measuring device are set to different values with each other.

As similar to Embodiment 1, the first time resolution $\Delta t1$ is set to a value obtained by dividing the maximum light receiving time Tct1$m$ corresponding to the maximum measurable object distance Lm of the laser distance measuring apparatus 10, by the maximum counter value $2^N$ ($\Delta t1=$Tct1$m/2^N$). The second time resolution $\Delta t2$ is set to a value smaller than the first time resolution $\Delta t1$.

The distance calculation unit 15 calculates, as the first light receiving time Tct1, a value obtained by multiplying the first time resolution $\Delta t1$ to the counter value Cnt1 which is outputted from the first time measuring device. The distance calculation unit 15 calculates, as the second lights receiving time Tct2, a value obtained by multiplying the second time resolutions $\Delta t2$ to the counter value Cnt2 which is outputted from the second time measuring device.

When the first light receiving time Tct1 is greater than or equal to the boundary value Tct2$m$, the distance calculation unit 15 selects the first light receiving time Tct1 as the measurement result of the light receiving time used for calculation of the object distance. When the first light receiving time Tct1 is smaller than the boundary value Tct2$m$, the distance calculation unit 15 selects the second light receiving time Tct2 as the measurement result of the light receiving time used for calculation of the object distance L. The boundary value Tct2$m$ is set to a value obtained by multiplying the maximum counter value $2^N$ to the second time resolution $\Delta t2$ (Tct2$m=\Delta t2\times 2^N$). Then, the distance calculation unit 15 calculates the object distance, based on the measurement result of the one light receiving time selected by the distance calculation unit 15.

Figure 20:
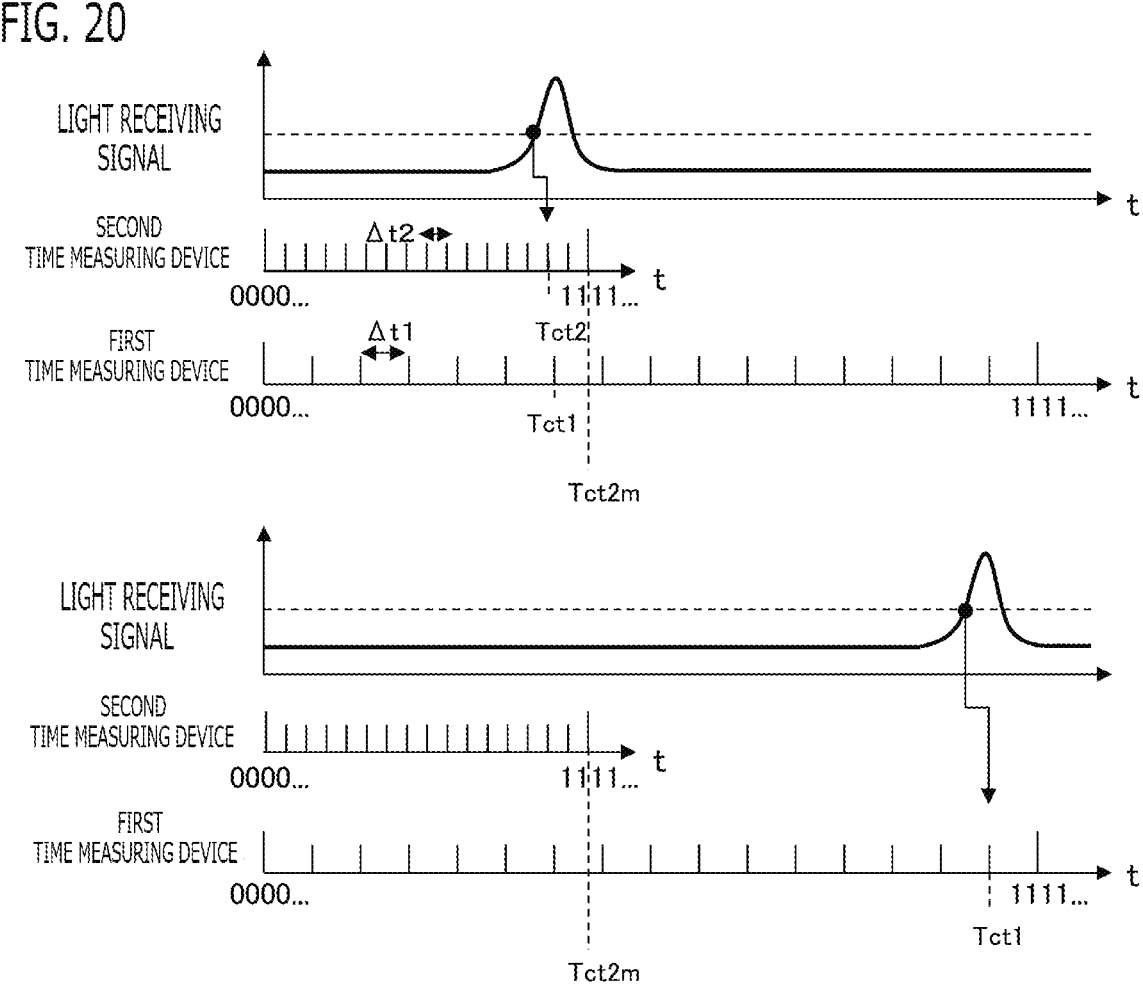
FIG. 20 is a time chart for explaining the measurement behavior of the light receiving time according to Embodiment 5.

An example is shown in FIG. 20. In the time chart group of the upper stage of FIG. 20, the object is comparatively close and the first light receiving time Tct1 is smaller than the boundary value Tct2$m$. Accordingly, the second light receiving time Tct2 is selected as the measurement result of the light receiving time used for calculation of the object distance. Therefore, the distance measurement precision of the short distance object is improved. On the other hand, in the time chart group of the lower stage of FIG. 20, the object is comparatively far and the first light receiving time Tct1 is larger than the boundary value Tct2m. Accordingly, the first light receiving time Tct1 is selected as the measurement result of the light receiving time used for calculation of the object distance. Therefore, the distance of the long distance object can be measured.

6. Embodiment 6

Next, the laser distance measuring apparatus 10 according to Embodiment 6 will be explained. The explanation for constituent parts the same as those in Embodiment 1 will be omitted. The basic configuration of the laser distance measuring apparatus 10 according to the present embodiment is the same as that of Embodiment 1; however, Embodiment 6 is different from Embodiment 1 in configuration of time measuring devices 94.

Figure 21:
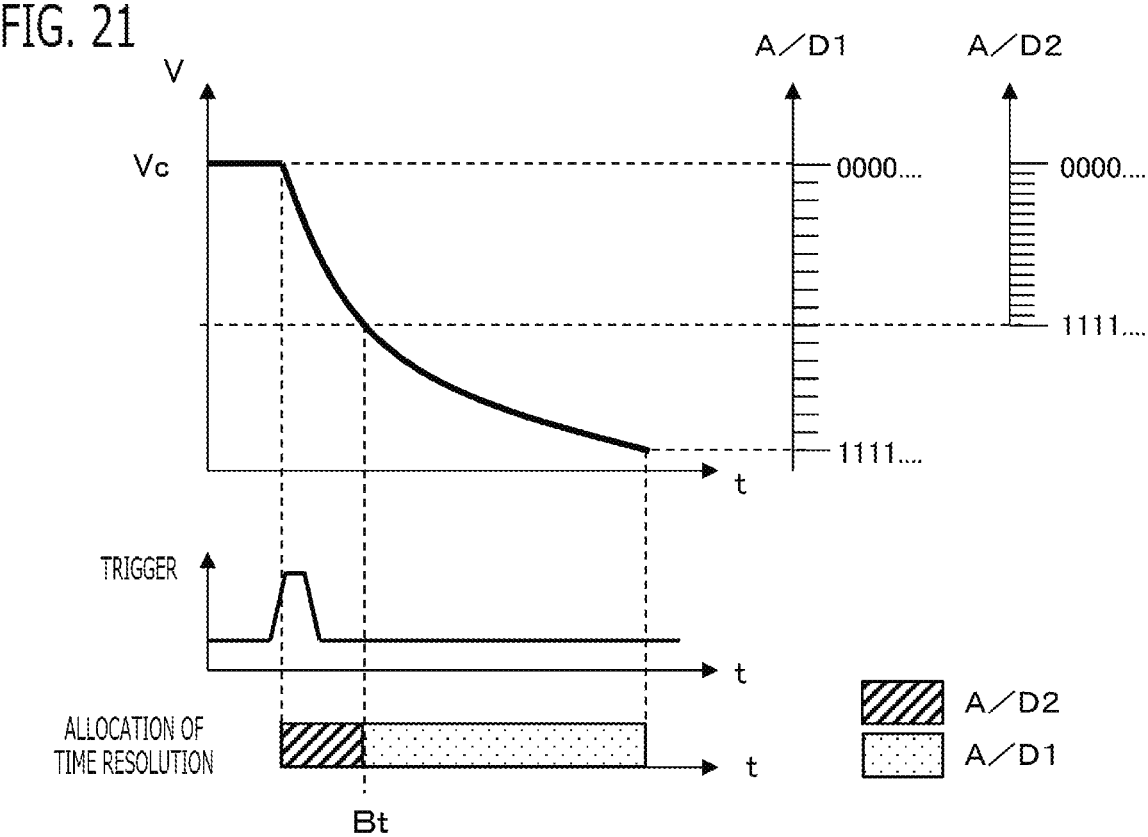
FIG. 21 is a figure for explaining the capacitor charge type time measuring device according to Embodiment 6.

In the present embodiment, the time measuring device 94 is a capacitor charge type time measuring device. FIG. 21 is a schematic diagram showing principle of the capacitor charge type time measuring device. After charging a capacitor to a voltage of Vc, when the capacitor is connected to a load and discharged, the terminal voltage V of the capacitor drops with the lapse of time t according to the next equation.

$$V = Vc \times \exp(-t/(R \times C)) \quad (10)$$

Herein, R is resistance of the load, and C is capacity of the capacitor. Therefore, if R and C are known; by using emission of the laser beam as a trigger, the load is connected, and then the light receiving time Tct can be obtained by performing the A/D conversion of the terminal voltage V of the capacitor with the A/D converter.

For example, by previously storing the relationship between the terminal voltage V and the light receiving time Tct to the memory, voltage can be converted to time. In this case, the time resolution Δt depends on the resolution of the A/D converter. Therefore, when changing the time resolution Δt, the resolution of the A/D converter is changed, or a plurality of A/D converters in which resolutions are different with each other are used.

FIG. 21 shows the case where the first A/D converter (A/D1) with a large width of voltage measurement range and the second A/D converter (A/D2) with a small width of voltage measurement range are used. The digital conversion values of the first A/D converter (A/D1) and the second A/D converter (A/D2) are the same number of bits N. When the light receiving time Tct is smaller than the boundary value Bt, the distance calculation unit 15 calculates the light receiving time Tct using the A/D conversion value of the second A/D converter (A/D2). When the light receiving time Tct is greater than or equal to the boundary value Bt, the distance calculation unit 15 calculates the light receiving time Tct using the A/D conversion value of the first A/D converter (A/D1).

7. Embodiment 7

Next, the laser distance measuring apparatus 10 according to Embodiment 7 will be explained. The explanation for constituent parts the same as those in Embodiment 1 will be omitted. The basic configuration of the laser distance measuring apparatus 10 according to the present embodiment is the same as that of Embodiment 1; however, Embodiment 7 is different from Embodiment 1 in that the detection information is a speed of the vehicle which mounts the laser distance measuring apparatus 10.

It is considered that using the speed of the vehicle which mounts the laser distance measuring apparatus 10, the time resolution Δt is changed according to its magnitude. When the vehicle speed is high, the long distant object approaches in a short time. When the vehicle travels at high speed, since a possibility that the measuring object exists close to the vehicle is low, the importance of monitoring the long distant object increases. Therefore, the distance calculation unit 15 enlarges the time resolution Δt as the vehicle speed becomes large. The distance calculation unit 15 obtains the information on the vehicle speed from the car navigation apparatus 30, the controller of vehicle, or the like.

For example, when the vehicle speed is less than or equal to the boundary speed, the distance calculation unit 15 reduces the time resolution Δt (for example, the second time resolution Δt2 of Embodiment 1). At low speed, the obstacle close to the vehicle can be detected with good distance accuracy. When the vehicle speed is larger than the boundary speed, the distance calculation unit 15 enlarges the time resolution Δt (for example, the first time resolution Δt1 of Embodiment 1). By enlarging the time resolution at high speed, priority is given to the irradiation frequency and the updating speed of the laser beam over the distance accuracy, and the detection performance of the obstacle can be improved.

8. Embodiment 8

Next, the laser distance measuring apparatus 10 according to Embodiment 8 will be explained. The explanation for constituent parts the same as those in Embodiment 1 will be omitted. The basic configuration of the laser distance measuring apparatus 10 according to the present embodiment is the same as that of Embodiment 1; however, Embodiment 8 is different from Embodiment 1 in that the detection information is an acceleration of the vehicle which mounts the laser distance measuring apparatus 10.

A method to change the time resolution using the vehicle acceleration can be considered. For example, when the vehicle accelerates, the importance of monitoring the long distant obstacle increases. Then, by enlarging the time resolution, the distance of the long distant object can be measured, and existence of the object which can become the obstacle can be detected in an early stage. When decelerating, in order to detect in detail the obstacle which exists at the short distance, the time resolution is reduced and the measurement accuracy of the object distance is improved. Therefore, the distance calculation unit 15 enlarges the time resolution Δt as the vehicle acceleration becomes large. The distance calculation unit 15 obtains the information on the vehicle acceleration from the car navigation apparatus 30, the controller of vehicle, or the like.

For example, when the vehicle acceleration is less than or equal to the boundary acceleration, the distance calculation unit 15 reduces the time resolution Δt (for example, the second time resolution Δt2 of Embodiment 1). When the vehicle acceleration is larger than the boundary acceleration, the distance calculation unit 15 enlarges the time resolution Δt (for example, the first time resolution Δt1 of Embodiment 1).

9. Embodiment 9

Next, the laser distance measuring apparatus 10 according to Embodiment 9 will be explained. The explanation for constituent parts the same as those in Embodiment 1 will be omitted. The basic configuration of the laser distance measuring apparatus 10 according to the present embodiment is the same as that of Embodiment 1; however, Embodiment 9 is different from Embodiment 1 in that the detection information is an inclination of the vehicle.

Figure 22:
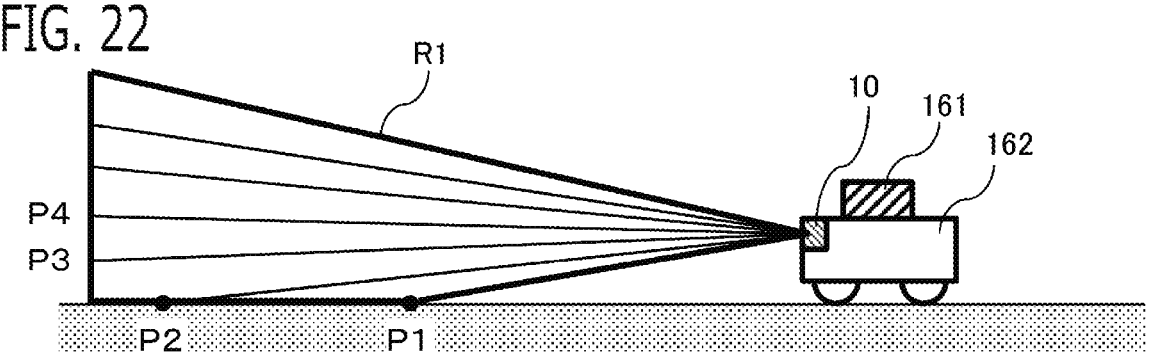
FIG. 22 is a figure showing the irradiation range when the vehicle inclination is horizontal according to Embodiment 9.
Figure 23:
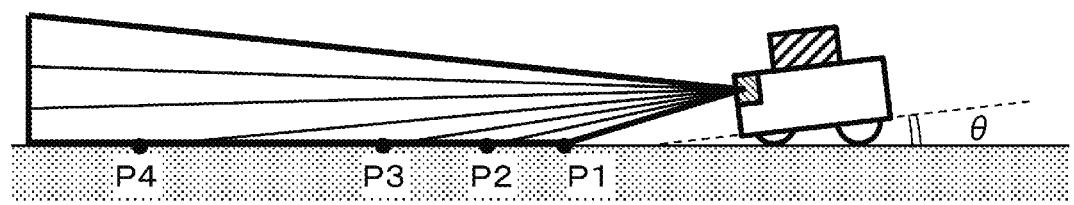
FIG. 23 is a figure showing the irradiation range when the vehicle inclines forward according to Embodiment 9.

FIG. 22 shows the case where the vehicle inclination is horizontal. FIG. 23 shows the case where the vehicle inclination θ inclines forward. The vehicle inclination θ is an angle of the front and back direction of the vehicle with respect to the road surface. On the vehicle 162, the attitude sensor 161 which detects the vehicle inclination, and the laser distance measuring apparatus 10 are mounted. The output signal of attitude sensor 161 is inputted into the laser distance measuring apparatus 10.

At the irradiation angle at which the laser beam hits the road surface within the irradiation range R of the laser beam of the laser distance measuring apparatus 10, it is expected that the light receiving time becomes short. Therefore, the distance calculation unit 15 reduces the time resolution Δt at the irradiation angle at which the laser beam hits the road surface. Accordingly, it is possible to increase the measurement accuracy of distance.

The irradiation angle range of the laser beam which hits the road surface varies according to the vehicle inclination. In the case of horizontal of FIG. 22, the irradiation angles at which the road surface is irradiated are P1 and P2. On the other hand, in the case of inclining forward of FIG. 23, the irradiation angles at which the road surface is irradiated increases to P1, P2, P3, and P4. Therefore, the distance calculation unit 15 changes the lower side irradiation angle range in which the time resolution is reduced, according to the vehicle inclination. The distance calculation unit 15 increases the lower side irradiation angle range in which the time resolution is reduced, as the vehicle inclination inclines forward. Accordingly, even if the vehicle inclination varies by the vibration at traveling of the vehicle or the number of occupants, it becomes possible to enhance the measurement accuracy of the distance of the short distance object.

10. Embodiment 10

Next, the laser distance measuring apparatus 10 according to Embodiment 10 will be explained. The explanation for constituent parts the same as those in Embodiment 1 will be omitted. The basic configuration of the laser distance measuring apparatus 10 according to the present embodiment is the same as that of Embodiment 1; however, Embodiment 10 is different from Embodiment 1 in that the detection information is a time change of the light receiving time.

The time change of the light receiving time is proportional to the relative velocity between the laser distance measuring apparatus 10 and the object. FIG. 24 shows the example of the own vehicle 162 which mounts the laser distance measuring apparatus 10, and the oncoming vehicle 192. The laser distance measuring apparatus 10 detects the distance of the oncoming vehicle 192 approaching to the own vehicle 162, in the irradiation angle range R. The distance calculation unit 15 changes the time resolution according to the time change (relative velocity) of the light receiving time. The distance calculation unit 15 reduces the time resolution, as the time change (relative velocity) of the light receiving time becomes large. The distance calculation unit 15 may change the time resolution of the irradiation angle 191 at which the light receiving time was measured, according to the time change (relative velocity) of the light receiving time. The object having large relative velocity approaches the own vehicle 162 quickly. By reducing the time resolution, it becomes possible to measure the distance of object, such as the oncoming vehicle, which approaches the own vehicle quickly, with good accuracy.

Other Embodiments

Lastly, other embodiments of the present disclosure will be explained. Each of the configurations of embodiments to be explained below is not limited to be separately utilized but can be utilized in combination with the configurations of other embodiments as long as no discrepancy occurs.

(1) In each of the above-mentioned Embodiments, there has been explained the case where the scanning mechanism 12 is provided with the MEMS mirror 121. However, the scanning mechanism 12 may be provided with scanning mechanisms other than the MEMS mirror 121. For example, the scanning mechanism 12 may be provided with a rotary polygon mirror as the movable mirror, and may be provided with a mechanism that inclines a rotary shaft of the rotary polygon mirror so that the irradiation angle range of the up and down direction moves to the up side or the down side.

(2) In each of the above embodiments, there has been explained the case where the minute mirror is moved by Lorentz force. However, the movable mechanism of minute mirror is not limited to the electromagnetic method such as Lorentz force, may be a piezo-electric method using a piezoelectric element, or an electrostatic method using electrostatic force by the potential difference between mirror and electrode.

(3) In each of the above embodiments, there has been explained the case where the two-dimensional scan is performed by the scan as shown in FIG. 5 using the MEMS mirror 121. However, the two-dimensional scan may be performed by a Lissajous scan or a raster scan using the MEMS mirror 121; and a precessional scan may be performed using a sphere mirror.

(4) In each of the above embodiments, there has been explained the case where the two-dimensional scan is performed using the MEMS mirror 121 which rotates the mirror around two rotary shafts. However, the two-dimensional scan may be performed using two MEMS mirrors each of which rotates the mirror around one rotary shaft.

(5) In each of the above embodiments, there has been explained the case where the laser beam of the one laser beam source 111 is reflected by the MEMS mirror 121. However, the laser beams of plural laser beam sources 111 may be reflected by the MEMS mirror 121.

(6) In each of the above embodiments, there has been explained the case where the light detector 131 receives the reflected light L2 reflected by the MEMS mirror 121 and the collection mirror 133. However, the light detector 131 may receive directly the reflected light L2 reflected by the object.

Although the present disclosure is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations to one or more of the embodiments. It is therefore understood that numerous modifications which have not been exemplified can be devised without departing from the scope of the present disclosure. For example, at least one of the constituent components may be modified, added, or eliminated. At least one of the constituent components mentioned in at least one of the preferred embodiments may be selected and combined with the constituent components mentioned in another preferred embodiment.

What is claimed is:

1. A laser distance measuring apparatus comprising:
a laser beam generator that emits a laser beam;
a light receiver that receives a reflected light of the laser beam reflected by an object, and outputs a light receiving signal;
a time measuring device that measures, with a time resolution, a light receiving time which is a time from a time point when the laser beam generator emits the laser beam to a time point when the light receiver outputs the light receiving signal; and
a distance calculator that calculates an object distance which is a distance to the object, based on the measurement result of the light receiving time by the time measuring device,
wherein the distance calculator changes the time resolution of the time measuring device used for calculation of the object distance, based on detection information, and
wherein the time measuring device is a counter type, and is a time digital converter which converts signal in time domain into a digital value.

2. The laser distance measuring apparatus according to claim 1,
wherein the detection information is at least one of the light receiving time, a time change of the light receiving time, a speed of a vehicle on which the laser distance measuring apparatus is mounted, an acceleration of the vehicle, and an inclination of the vehicle.

3. The laser distance measuring apparatus according to claim 1,
wherein the detection information is the light receiving time, and
wherein the distance calculator enlarges the time resolution as the measured light receiving time becomes long.

4. The laser distance measuring apparatus according to claim 1,
wherein the detection information is the light receiving time, and
wherein the distance calculator enlarges the time resolution, when the time measuring device cannot measure the light receiving time.

5. The laser distance measuring apparatus according to claim 1,
wherein the detection information is the light receiving time, and
wherein by referring to a resolution setting data in which setting value of the time resolution is preliminarily set in each of a plurality of divided regions in which a possible range of the light receiving time is divided, the distance calculator sets the time resolution of the divided region corresponding to the measured light receiving time.

6. The laser distance measuring apparatus according to claim 1,
wherein the detection information is the light receiving time, and
wherein the distance calculator changes the time resolution so that a value obtained by adding a margin time to the measured light receiving time becomes a maximum measurable light receiving time.

7. The laser distance measuring apparatus according to claim 1,
wherein the detection information is the light receiving time, and
wherein the distance calculator changes the time resolution at this time measurement, based on the light receiving time measured immediately before.

8. A laser distance measuring apparatus comprising:
a laser beam generator that emits a laser beam;
a light receiver that receives a reflected light of the laser beam reflected by an object, and outputs a light receiving signal;
a time measuring device that measures, with a time resolution, a light receiving time which is a time from a time point when the laser beam generator emits the laser beam to a time point when the light receiver outputs the light receiving signal;
a distance calculator that calculates an object distance which is a distance to the object, based on the measurement result of the light receiving time by the time measuring device, wherein the distance calculator changes the time resolution of the time measuring device used for calculation of the object distance, based on detection information:
a scanning mechanism that change an irradiation angle of the laser beam, and
a scanning controller that controls the scanning mechanism to scan the irradiation angle of the laser beam periodically,
wherein the detection information is the light receiving time, and
wherein the distance calculator changes the time resolution at this time measurement, based on the light receiving time measured at the irradiation angle of the last time scanning period corresponding to the irradiation angle of this time measurement.

9. A laser distance measuring apparatus comprising:
a laser beam generator that emits a laser beam;
a light receiver that receives a reflected light of the laser beam reflected by an object, and outputs a light receiving signal;
a time measuring device that measures, with a time resolution, a light receiving time which is a time from a time point when the laser beam generator emits the laser beam to a time point when the light receiver outputs the light receiving signal; and
a distance calculator that calculates an object distance which is a distance to the object, based on the measurement result of the light receiving time by the time measuring device,
wherein the distance calculator changes the time resolution of the time measuring device used for calculation of the object distance, based on detection information,
wherein the time measuring device is a capacitor charge type, and changes the time resolution, by performing A/D conversion of an output voltage of a capacitor, using a plurality of A/D converters in which widths of voltage measurement range are different with each other.

10. A laser distance measuring apparatus comprising:
a laser beam generator that emits a laser beam;
a light receiver that receives a reflected light of the laser beam reflected by an object, and outputs a light receiving signal;
a time measuring device that measures, with a time resolution, a light receiving time which is a time from a time point when the laser beam generator emits the laser beam to a time point when the light receiver outputs the light receiving signal; and a distance calculator that calculates an object distance which is a distance to the object, based on the measurement result of the light receiving time by the time measuring device, wherein the distance calculator changes the time resolution of the time measuring device used for calculation of the object distance, based on detection information, wherein the detection information is the light receiving time, wherein a plurality of the time measuring devices in which the time resolutions are different with each other are provided, wherein the distance calculator selects the one time measuring device used for this time measurement, from the plurality of time measuring devices, based on the measured light receiving time, and wherein the distance calculator calculates the object distance based on the measurement result of the light receiving time of the one selected time measuring device.

11. A laser distance measuring apparatus comprising:

a laser beam generator that emits a laser beam;

a light receiver that receives a reflected light of the laser beam reflected by an object, and outputs a light receiving signal;

a time measuring device that measures, with a time resolution, a light receiving time which is a time from a time point when the laser beam generator emits the laser beam to a time point when the light receiver outputs the light receiving signal; and a distance calculator that calculates an object distance which is a distance to the object, based on the measurement result of the light receiving time by the time measuring device, wherein the distance calculator changes the time resolution of the time measuring device used for calculation of the object distance, based on detection information, wherein the detection information is the light receiving time, a plurality of the time measuring devices in which the time resolutions are different with each other are provided, wherein the distance calculator selects the one measurement result of the light receiving time used for calculation of the object distance, from the plurality of the measurement results of the light receiving time which are measured by the plurality of time measuring devices, and wherein the distance calculator calculates the object distance based on the one selected measurement result of the light receiving time.

\* \* \* \* \*